United States Patent
Fruchter et al.

(10) Patent No.: US 11,210,240 B2
(45) Date of Patent: *Dec. 28, 2021

(54) MEMORY APPLIANCE COUPLINGS AND OPERATIONS

(71) Applicant: Rambus Inc., Sunnyvale, CA (US)

(72) Inventors: Vlad Fruchter, Los Altos, CA (US); Keith Lowery, Garland, TX (US); George Michael Uhler, Mountain View, CA (US); Steven Woo, Saratoga, CA (US); Chi-Ming (Philip) Yeung, Cupertino, CA (US); Ronald Lee, Pleasanton, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,010

(22) Filed: Oct. 7, 2019

(65) Prior Publication Data
US 2020/0110715 A1    Apr. 9, 2020

Related U.S. Application Data

(63) Continuation of application No. 15/096,111, filed on Apr. 11, 2016, now Pat. No. 10,437,747.

(60) Provisional application No. 62/146,151, filed on Apr. 10, 2015, provisional application No. 62/197,932, filed on Jul. 28, 2015.

(51) Int. Cl.
*G06F 13/16* (2006.01)
*G06F 13/40* (2006.01)
*G06F 13/42* (2006.01)

(52) U.S. Cl.
CPC ...... *G06F 13/1668* (2013.01); *G06F 13/4022* (2013.01); *G06F 13/4068* (2013.01); *G06F 13/4282* (2013.01); *Y02D 10/00* (2018.01)

(58) Field of Classification Search
CPC .. G06F 12/00; G06F 13/1668; G06F 13/4022; G06F 13/4068; G06F 13/4282
See application file for complete search history.

(56) References Cited

U.S. PATENT DOCUMENTS

| | | |
|---|---|---|
| 6,965,911 B1 | 11/2005 | Coffman et al. |
| 7,210,004 B2 | 4/2007 | Guha et al. |
| 7,716,323 B2 | 5/2010 | Gole et al. |
| 8,145,837 B2 | 3/2012 | Ballew et al. |
| 8,296,476 B2 | 10/2012 | Zhang et al. |
| 8,583,867 B1 | 11/2013 | Radhakrishnan et al. |
| 8,601,199 B2 | 12/2013 | Tolliver |
| 8,806,098 B1 | 8/2014 | Mandapuram et al. |
| 8,868,865 B1 * | 10/2014 | Kondoh ............ G06F 13/4282 711/162 |
| 9,021,166 B2 | 4/2015 | Varchavtchik et al. |
| 9,389,805 B2 * | 7/2016 | Cohen ................ G06F 3/0679 |
| 9,733,845 B2 | 8/2017 | Smith et al. |

(Continued)

*Primary Examiner* — Cheng Yuan Tseng
(74) *Attorney, Agent, or Firm* — Lowenstein Sandler LLP

(57) ABSTRACT

System and method for improved transferring of data involving memory device systems. A memory appliance (MA) comprising a plurality of memory modules is configured to store data within the plurality of memory modules and further configured to receive data commands from the first server and a second server coupled to the MA. The data commands may include direction memory access commands such that the MA can service the data commands while bypassing a host controller of the MA.

17 Claims, 28 Drawing Sheets

(56) References Cited

U.S. PATENT DOCUMENTS

| | | |
|---|---|---|
| 2002/0161596 A1 | 10/2002 | Johnson et al. |
| 2013/0179622 A1 | 7/2013 | Pratt et al. |
| 2014/0164666 A1 | 6/2014 | Yang |
| 2015/0201016 A1 | 7/2015 | Golander et al. |
| 2015/0317280 A1 | 11/2015 | Magro et al. |

* cited by examiner

MEMORY APPLIANCE COUPLINGS AND OPERATIONS

CROSS REFERENCE TO RELATED APPLICATIONS

This application is a continuation of U.S. application Ser. No. 15/096,111, entitled "MEMORY APPLIANCE COUPLINGS AND OPERATIONS," with filing date Apr. 11, 2016, issued as U.S. Pat. No. 10,437,747, on Oct. 8, 2019, which is herein incorporated by reference in its entirety.

This application claims the benefit of and priority to the provisional patent application, U.S. Ser. No. 62/146,151, entitled "IMPROVED MEMORY TRANSFER PERFORMANCE," with filing date Apr. 10, 2015, which is herein incorporated by reference in its entirety.

This application claims the benefit of and priority to the provisional patent application, U.S. Ser. No. 62/197,932, entitled "MEMORY APPLIANCE CONNECTION METHODS," with filing date Jul. 28, 2015, which is herein incorporated by reference in its entirety.

The application is related to the non-provisional patent application U.S. Ser. No. 15/048,690, entitled "MODULE BASED DATA TRANSFER," with filing date Feb. 19, 2016, which is herein incorporated by reference in its entirety.

The application is related to the non-provisional patent application U.S. Ser. No. 14/539,740, entitled "HIGH LEVEL INSTRUCTIONS WITH LOWER-LEVEL ASSEMBLY CODE STYLE PRIMITIVES WITHIN A MEMORY APPLIANCE FOR ACCESSING MEMORY," with filing date Nov. 12, 2014, which is herein incorporated by reference in its entirety.

BACKGROUND

Increasingly, digital information is stored and processed in large data storage systems. At a base level, these data storage systems are configured with large amounts of memory to support the processing of the large amounts of data. However, the current designs limit the efficiency of these systems.

BRIEF DESCRIPTION OF THE DRAWINGS

Further aspects of the present disclosure will become apparent from the following description which is given by way of example only and with reference to the accompanying drawings in which.

DETAILED DESCRIPTION

Figure 1A:
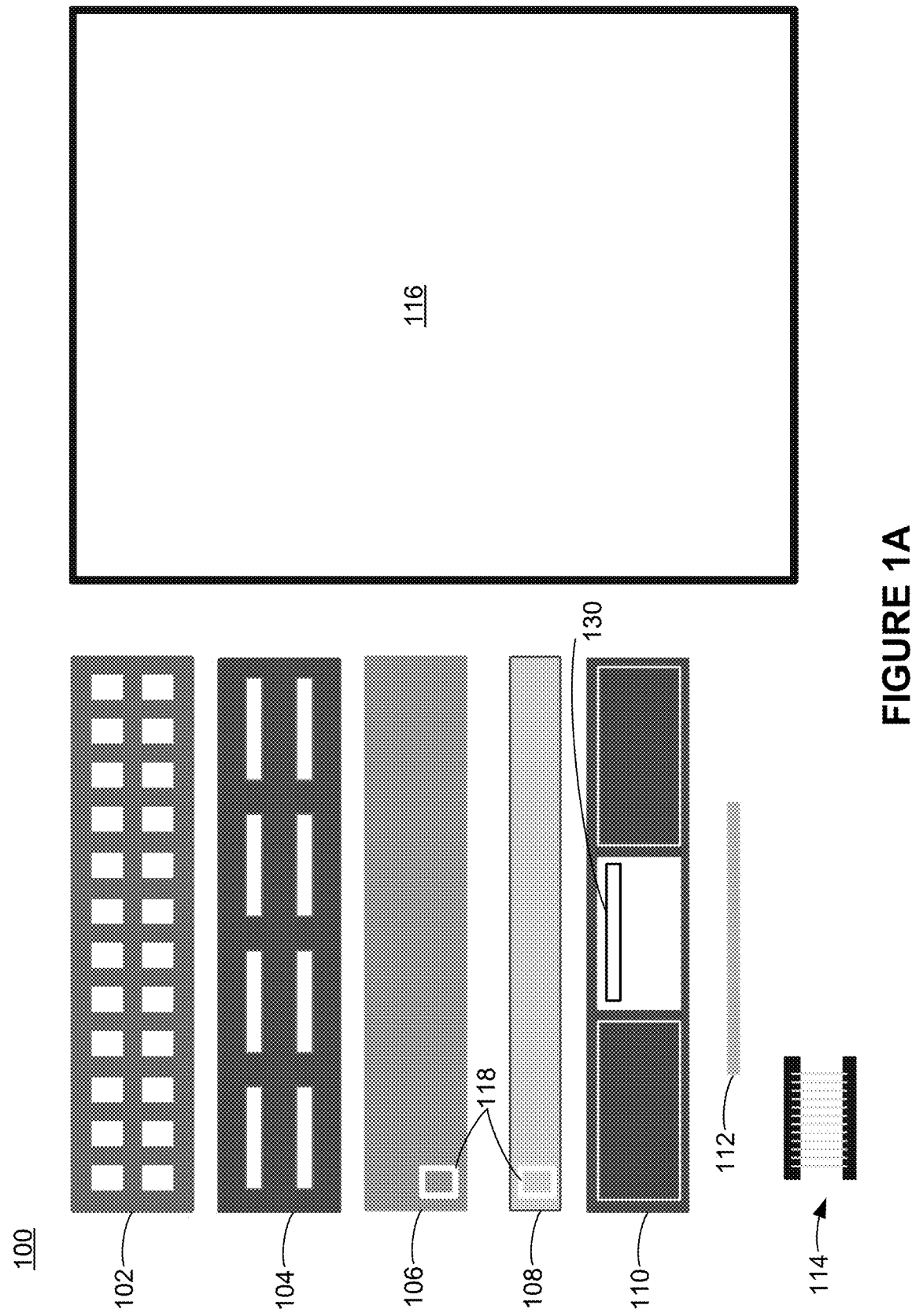
FIG. 1A shows a legend of example system components, in accordance with various embodiments.

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The Figures illustrate example components used by various embodiments. Although specific components are disclosed in the Figures, it should be appreciated that such components are exemplary. That is, embodiments are well suited to having various other components or variations of the components recited in the Figures. It is appreciated that the components in the Figures may operate with other components than those presented, and that not all of the components of the Figures are required to achieve the goals of embodiments.

A memory appliance, as described herein, is a system comprising a plurality of memory modules, e.g., on one or more circuit boards, and may include functionality, e.g., implemented via a processor or other component, for handling requests and access to the plurality of memory modules and/or the memory appliance may be coupled to a computing device, e.g., to significantly increase the memory resources, e.g., random access memory (RAM), non-volatile memory, storage class memory, and combinations thereof, available to the computing device. A memory device as described herein may be part of a memory appliance and include a plurality of memory modules, e.g., 1 Terabyte (TB) or more of double data rate (DDR) RAM, coupled to a memory controller. In some embodiments, a plurality of memory devices are configured as peers as part of a memory appliance. The memory controller provides access to the large amount of memory within the associated memory device. The memory controller can be a field-programmable gate array (FPGA), an application-specific integrated circuit (ASIC), a system on a chip (SoC), etc. In some embodiments, the FPGA is configurable to perform various computational and other processing functions on the fly. For example, the FPGA may be configured to sort data or filter data as the data is being transferred.

In some embodiments, the memory devices are coupled to other components of the memory appliance, e.g., a host CPU or a NIC, through a local interconnect. The local interconnect can be a PCIe bus. In some embodiments, a NIC can be an Ethernet network controller or an InfiniBand network controller. The NIC provides access to the network and performs transfers to and from the network.

There are a variety of ways to connect a memory appliance. While various embodiments are described with respect to PCIe, embodiments can support other interconnects including, but not limited to, InfiniBand. A single server may be connected to a single server, e.g., via a network (e.g., Ethernet), a PCIe switch, or a direct PCIe connection. A single server may be connected to multiple memory appliances, e.g., via a network (e.g., Ethernet), a PCIe switch, or a direct PCIe connection. Multiple servers may be connected to a single memory appliance, e.g., via a network (e.g., Ethernet), a PCIe switch, or a direct PCIe connection. Multiple servers may be connected to multiple memory appliances, e.g., via a network (e.g., Ethernet), a PCIe switch, or a direct PCIe connection.

FIG. 1A shows a legend of example system components, in accordance with various embodiments. FIG. 1A depicts a legend 100 of example system components that may be coupled to function as one or more computing systems configured for storing data, handling requests, and performing computations. The legend 100 includes a network switch 102 (e.g., an Ethernet switch), a PCIe switch 104, a server 106 (e.g., a 2 U server), a memory appliance server 108 (e.g., a 1 U Xeon-based front-end server), a memory device or system 110, a network cable 112 (e.g., Ethernet cable), and a PCIe cable (or interconnect) 114, and a rack 116.

The rack 116 provides a standardized frame or enclosure for mounting multiple equipment modules or components (e.g., the devices, systems, and other pieces of equipment of legend 100). The network switch 102 is configured for communicatively coupling (e.g., with one or more of network cable 112) the server 106 and the memory appliance server 108 to each other and to one or more networks (e.g., the Internet, a local area network (LAN), a wide area network (WAN), etc.). In some embodiments, the network switch 102 is a top of rack switch. The PCIe switch 104 is configured for communicatively coupling (e.g., with one or more of PCIe cable 114) the server 106, the memory appliance server 108, and the memory system 110 to each other and other devices coupled to the PCIe switch 104. In some embodiments, other switching devices and associated cables may be used. For example, an InfiniBand (IB) switch and InfiniBand cables may be used in place of the PCIe switch 104 and PCIe cable 114. Embodiments can support other switch and cable technologies.

The server 106 may be a computing system with one or more processors, memory, storage, communication interfaces, etc. The server 106 may have components similar to those of computing system 2600 of FIG. 26.

The memory appliance server 108 of FIG. 1A may be a computing system with one or more processors, memory, etc., and can be configured for using a coupled memory system 110 for exclusive use, shared use, or any combination thereof. The memory appliance server 108 may thus act as a gatekeeper of memory of the memory system 110. For example, the memory appliance server 108 may partition various portions of the memory within the memory system 110 for use by one or more servers, e.g., the server 106. In some embodiments, a server can have independent ownership of a portion of the memory within the memory system 110. In other embodiments, a small pool of servers (e.g., server 106) may share a portion of the memory of the memory system 110.

Figure 26:
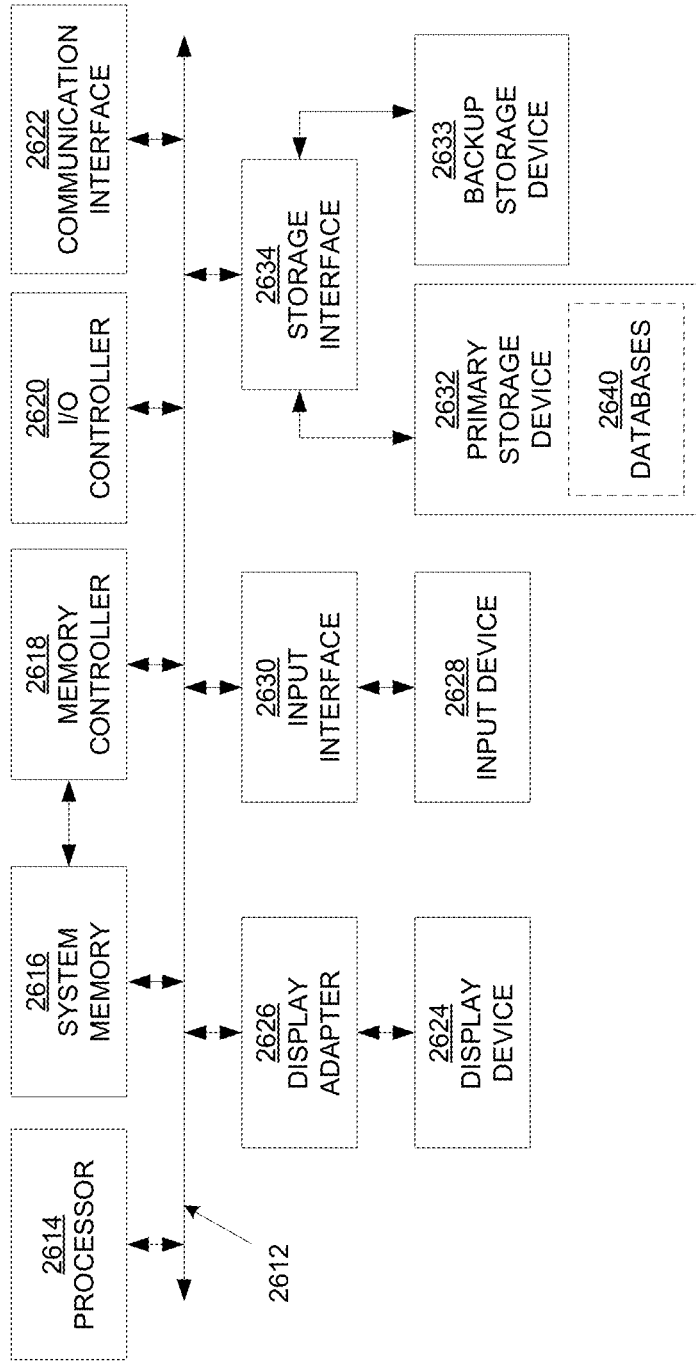
FIG. 26 is a block diagram of an exemplary computing system including various embodiments.

The memory appliance server 108 may have components similar to those of computing system 2600 of FIG. 26. The server 106 and the memory appliance server 108 may each include respective network ports 118 (e.g., an Ethernet port).

The memory system 110 of FIG. 1A includes a chassis (e.g., 2U) supporting memory building blocks (e.g., including DIMM modules). The memory system 110 may be configured to function as a memory appliance or may be configured to function as a memory appliance when coupled with the memory appliance server 108. In some embodiments, the memory system 110 includes an optional management component 130 (e.g., a system board) that is configured to function as a memory appliance server, e.g., the memory appliance server 108. The optional management component 130 may include a processor and other components, e.g., those of computing system 2600. In one embodiment, the optional management component 130 may be a single board computer (e.g., with a Xeon processor). In some embodiments, the optional management component 130 may include a field-programmable gate array (FPGA), a microcontroller, an application-specific integrated circuit (ASIC), a system on a chip (SoC), etc. The optional management component 130 may further be able to function as an accelerator, e.g., to accelerate computations, memory access, or data transformations.

The network cable 112 is configured for communicatively coupling the server 106 or the memory appliance server 108 with the network switch 102. The PCIe cable 114 is configured for communicatively coupling the server 106 or the memory appliance server 108 with the PCIe switch 104. The PCIe cable 114 may further be configured for coupling the memory system 110 with the server 106 or the memory appliance server 108.

It is noted the similar elements numbers described with respect to other Figures as those of legend 100 can represent components with substantially similar function and/or structure.

Figure 1B:
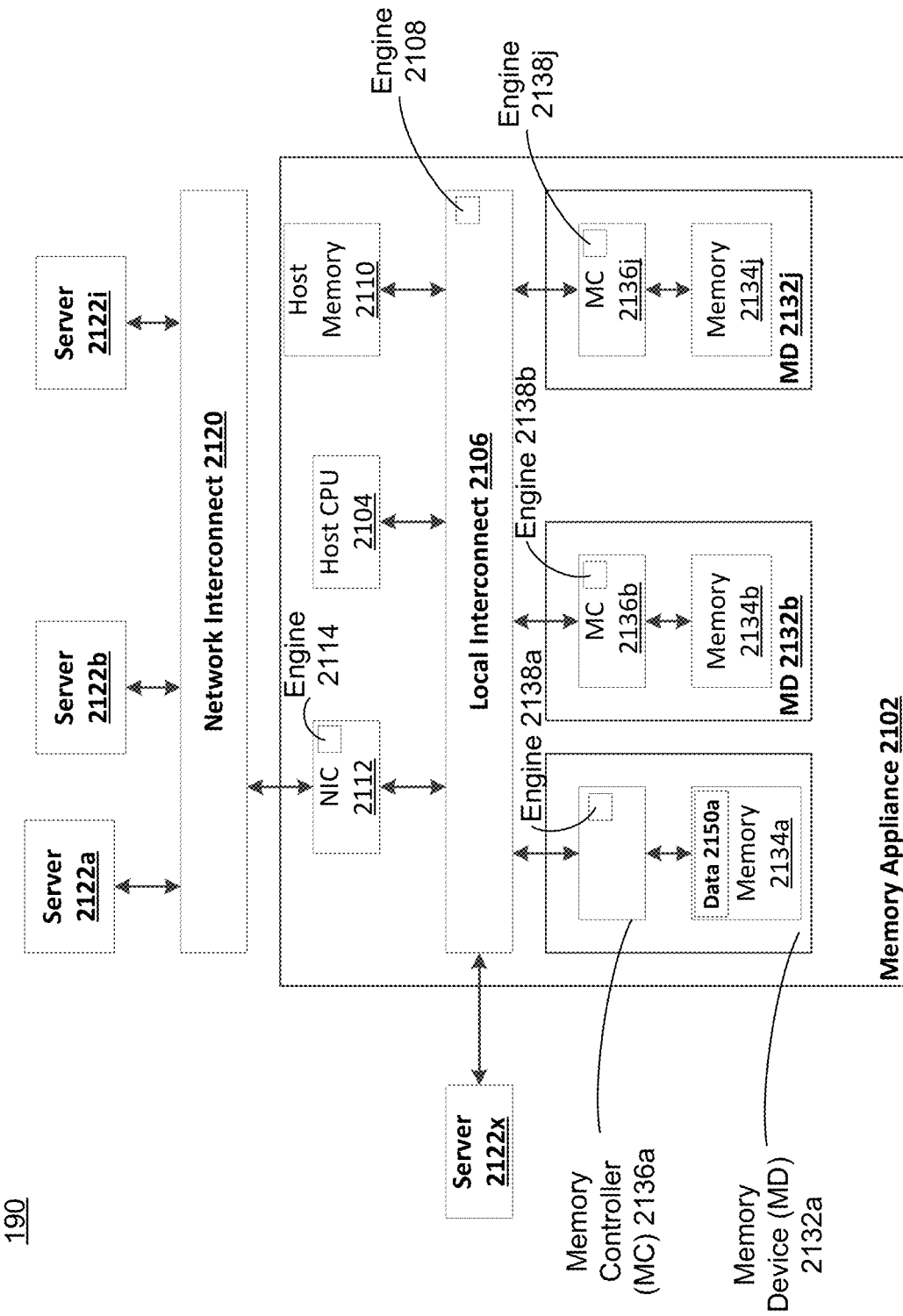
FIG. 1B shows an example memory appliance and coupling thereof, in accordance with various embodiments.

FIG. 1B shows an example memory appliance and coupling thereof, in accordance with various embodiments. FIG. 1B depicts example components of a memory appliance 2102 (e.g., the memory system 110). In some embodiments, the memory appliance 2102 includes a NIC 2112, a memory appliance (MA) host or host CPU 2104, a host memory 2110, a local interconnect 2106, and memory devices 2132a-j (e.g., the memory system 110).

The local interconnect 2106 couples (e.g., communicatively) the NIC 2112, the host CPU 2104, the host memory 2110, the memory devices 2132a-i, and optionally a server 2112x (e.g., the server 106) together. In some embodiments, the local interconnect 2106 includes an engine 2108 configured to facilitate data transfers, as described herein.

The NIC 2112 is configured to provide the memory appliance 2102 and components thereof access to one or more networks (e.g., a local area network (LAN), a wide area network (WAN), and the Internet). The NIC 2112 may include an Ethernet adapter for coupling to Ethernet networks. In some embodiments, the NIC 2112 is coupled with network interconnect 2120, e.g., an Ethernet network, thereby enabling communication with one or more servers including servers 2122a-i (e.g., the server 106). The network interconnect 2120 may be a router, a switch, a hub, or other network communication device. The NIC 2112 may further include an engine 2114 configured to perform data transfers as described herein.

The host CPU 2104 may be a processor, a field-programmable gate array (FPGA), an application-specific integrated circuit (ASIC), a system on a chip (SoC), etc., configured to handle communication and requests made to the memory appliance 2102, and/or execute programs for the memory appliance 2102. The host CPU 2104 may be configured to offload requests, as described herein.

The host memory 2110 comprises memory (e.g., one or more memory modules, for instance, DIMMs) for use by the host CPU 2104 and other components of the memory appliance 2102. For example, the host memory 2110 may be used to store data and programs for execution of one or more programs by the host CPU 2104.

The memory devices 2132a-j include memory controllers 2136a-j and memory components 2134a-j. The memory controllers 2136a-j may be configured to handle access (e.g., read and write requests) to the memory components 2134a-j. In some embodiments, the memory controllers 2136a-j may include engines 2138a-j. The engines 2138a-j may be configured to perform data transfers between memory devices and/or computations, as described herein.

The memory components 2134a-j, may be composed of multiple boards, each with several memory modules (e.g., DIMMs). Each of the boards may form a "sub-unit" of memory in the memory appliance 2102. Thus, each memory appliance 2102 can have multiple sub-units of memory. Embodiments may further include multiple servers in a system (e.g., a rack) coupled to one sub-unit, while other sub-units are connected to only one server in the system. In some embodiments, each sub-unit can be connected to a different server in the system. The FIGS. 1A and 2-18 may generally depict the memory appliance as substantially one unit.

Embodiments may further support multiple memory appliances being "chained" together. The memory appliances may be coupled together to form larger memory appliances. For example, memory appliances may be chained together using PCIe connections. Groups of memory appliances may also be chained together. Various interconnect topologies may be possible for "chaining" memory appliances including, but not limited to, ring, mesh, multidimensional torus, etc.

The memory appliance 2102 and components thereof may have components substantially similar and functionality substantially similar to those described in the copending non-provisional patent application U.S. Ser. No. 14/539,740, entitled "HIGH LEVEL INSTRUCTIONS WITH LOWER-LEVEL ASSEMBLY CODE STYLE PRIMITIVES WITHIN A MEMORY APPLIANCE FOR ACCESSING MEMORY," with filing date Nov. 12, 2014, which is herein incorporated by reference in its entirety.

FIGS. 21-24 depict various systems comprising memory appliances and/or memory appliance components. In some embodiments, the NIC 2112, host CPU or memory appliance (MA) host 2104, and host memory 2110 of FIG. 21-24 may be part of a memory appliance server (e.g., memory appliance server 108). In other embodiments, the NIC 2112, host CPU 2104, and host memory 2110 of FIG. 21-24 may be part of a memory system management component (e.g., the management component 130 of the memory system 110). In other embodiments, the NIC 2112, host CPU 2104, and host memory 2110 of FIG. 21-24 may be split between a memory appliance server (e.g., memory appliance server 108) and a memory system management component (e.g., the management component 130 of the memory system 110). In some embodiments, the memory controllers 2136a-j of FIGS. 21-24 may be a management component (e.g., the management component 130) of a memory system (e.g., the memory system 110). The network interconnect 2120 of FIGS. 21-24 may be a network switch (e.g., network switch 102) or a PCIe switch (e.g., PCIe switch 104). The servers 2122a-i of FIGS. 21-24 be a server similar to the server 106. The memory devices 2132a-j of FIGS. 21-24 may be a memory appliance or memory system (e.g., memory system 110), or a "sub unit" of memory in the memory appliance.

Embodiments can further include methods and systems to improve performance by leveraging memory appliance (MA) architecture characteristics. They can include memory appliance strengths of large disaggregated memories, locally connected via a common high-speed low-latency interconnect (e.g. PCIe) within the same physical box. For example, the memory appliance can include double data rate (DDR) dual in-line memory modules (DIMMs), registered DIMMs (RDIMMs), load reduced DIMMs (LRDIMMs), Flash DIMMs, non-volatile memories (NVM), storage class memories (SCMs), etc. The proposed mechanisms improve system latency and bandwidth utilization by reducing the number of times data has to move across the CPU bus and/or the network. This can include movement of data to/from the CPU on its way to NIC, and movement of data between two or more client servers sharing data located in the same MA. A MA greatly benefits from supporting efficient and low-latency data transfers between the memory store and multiple remote network-attached clients. Embodiments are able to avoid transfers and thus provide improved performance and reduced power consumption.

In conventional network environments, many servers share the resources of a storage device. Data requested by a server is copied to a central processing unit (CPU) of the storage device and then sent to the server via a network interface. For example, the data is sent from a memory controller to the CPU over a local bus and then the data is sent from the CPU to the network interface via the local bus. This creates unnecessary CPU local memory bus traffic, increases transfer latency due to extra buffering along the way, and wastes valuable CPU cycles that can otherwise be used for processing, rather than for copying data.

Figure 2:
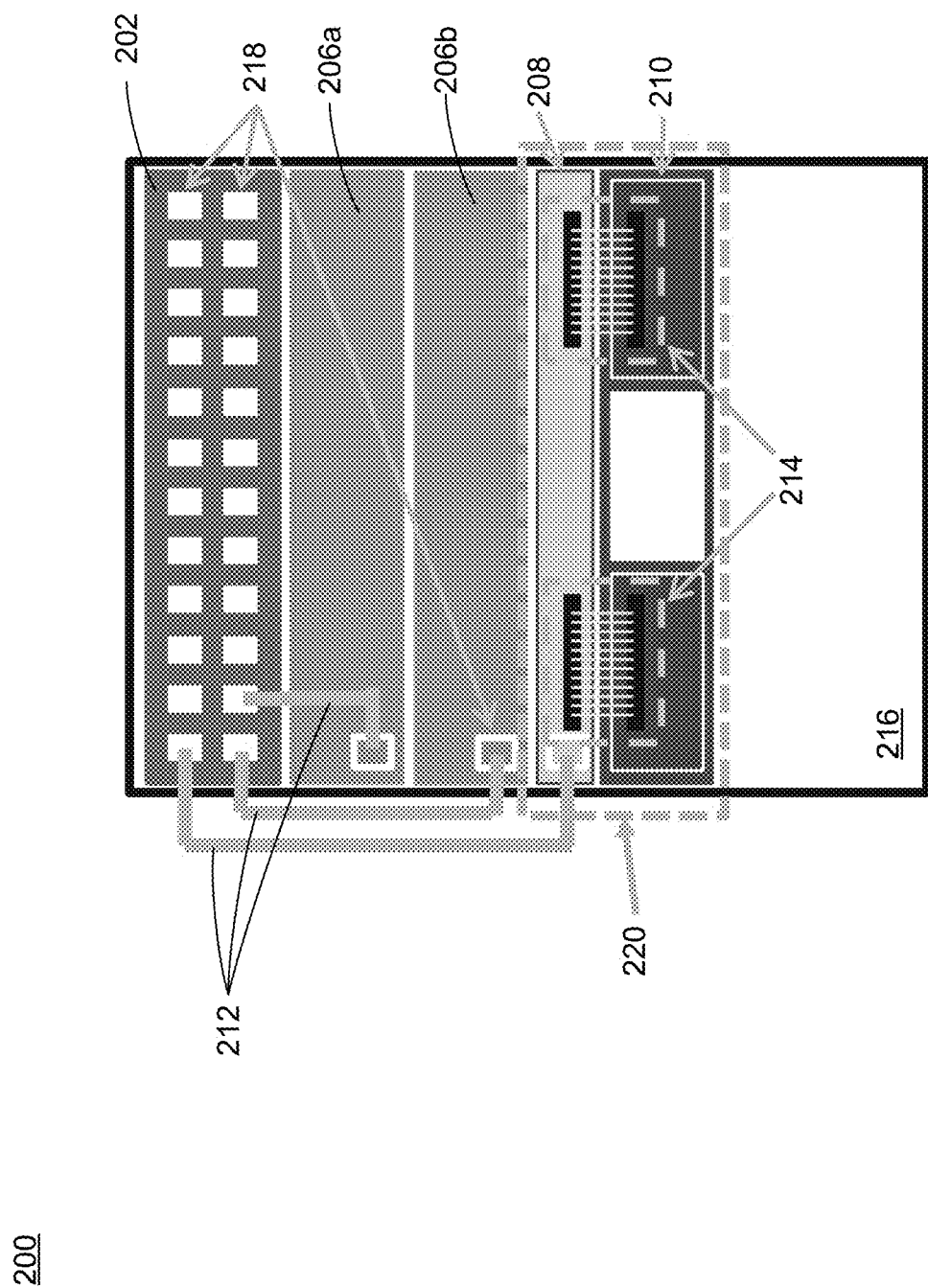
FIG. 2 shows an example rack with a network attached memory appliance, in accordance with various embodiments.

Referring to FIG. 2, FIG. 2 shows an example rack with a network attached memory appliance, in accordance with various embodiments. FIG. 2 depicts a rack 216 comprising a network switch 202 (e.g., the network switch 102), servers 206a-b (e.g., the server 106), and a memory appliance 220. The servers 206a-b and the memory appliance 220 are communicatively coupled via network cables 212 (e.g., Ethernet) and the network switch 202. The network switch 202 and the server 206b include networks ports 218.

The memory appliance 220 includes the memory appliance server 208 (e.g., the memory appliance server 108) and the memory system 210 (e.g., the memory system 110). The memory appliance server 208 and the memory system 210 are communicatively coupled by the PCIe cables 214. The memory appliance server 208 is configured to control access by the servers 206a-b to the memory system 210.

Figure 3:
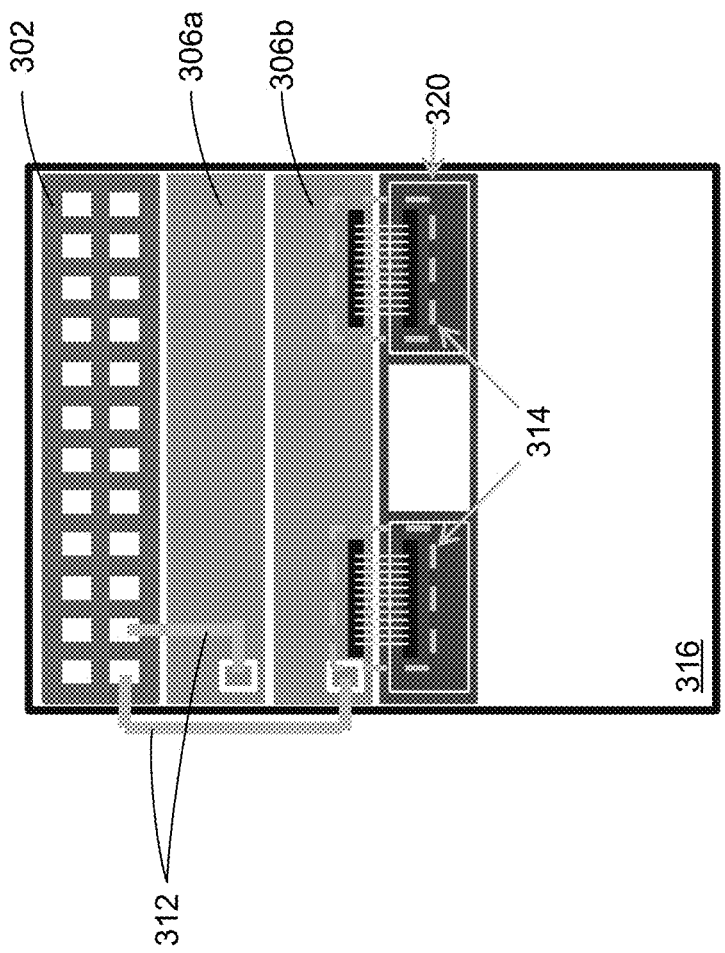
FIG. 3 shows an example rack with a server directly attached to a memory appliance, in accordance with various embodiments.
Figure 4:
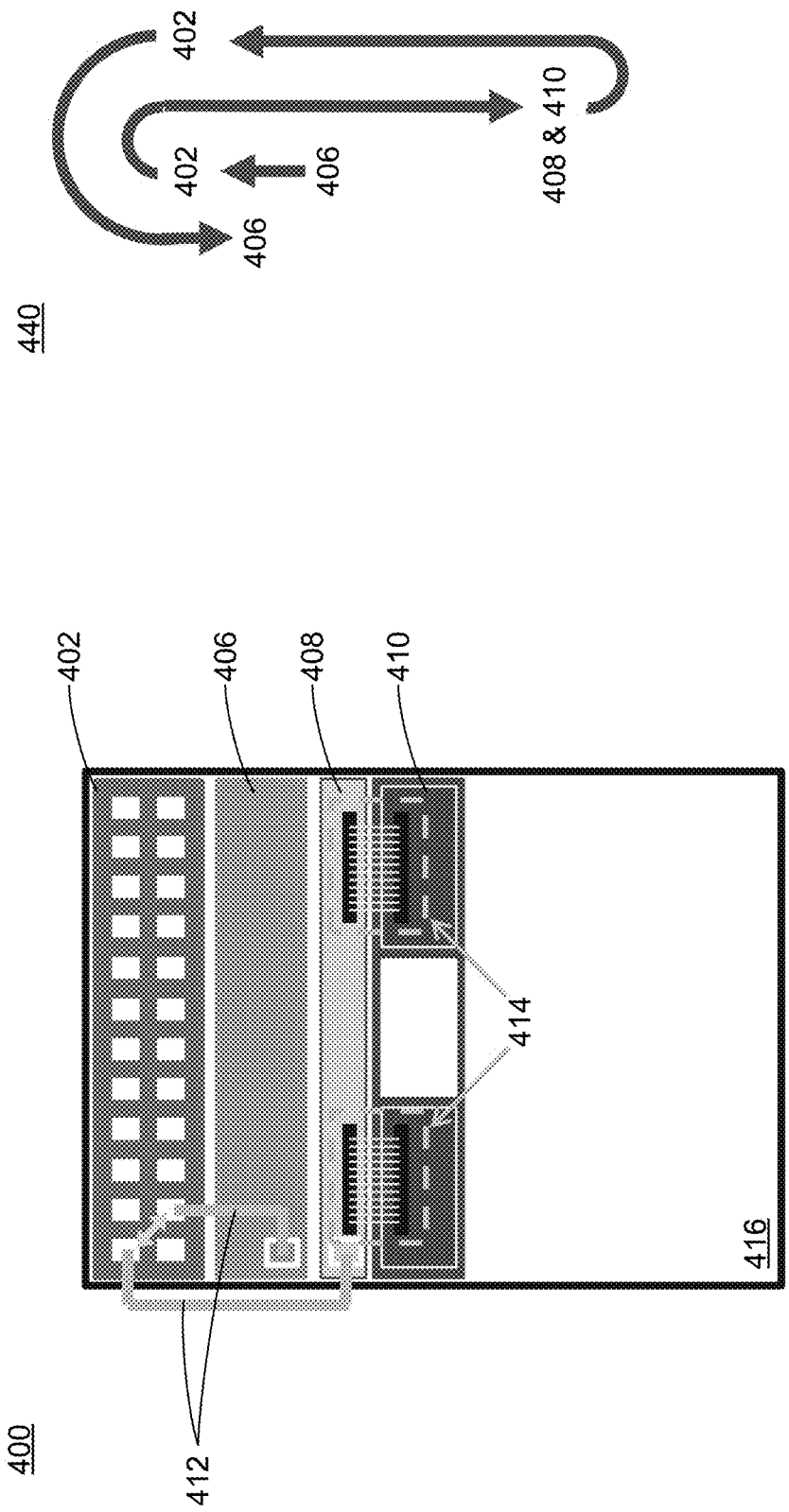
FIGS. 4A-B show an example access path for a read request from a server to a network attached memory appliance, in accordance with various embodiments.
Figure 5:
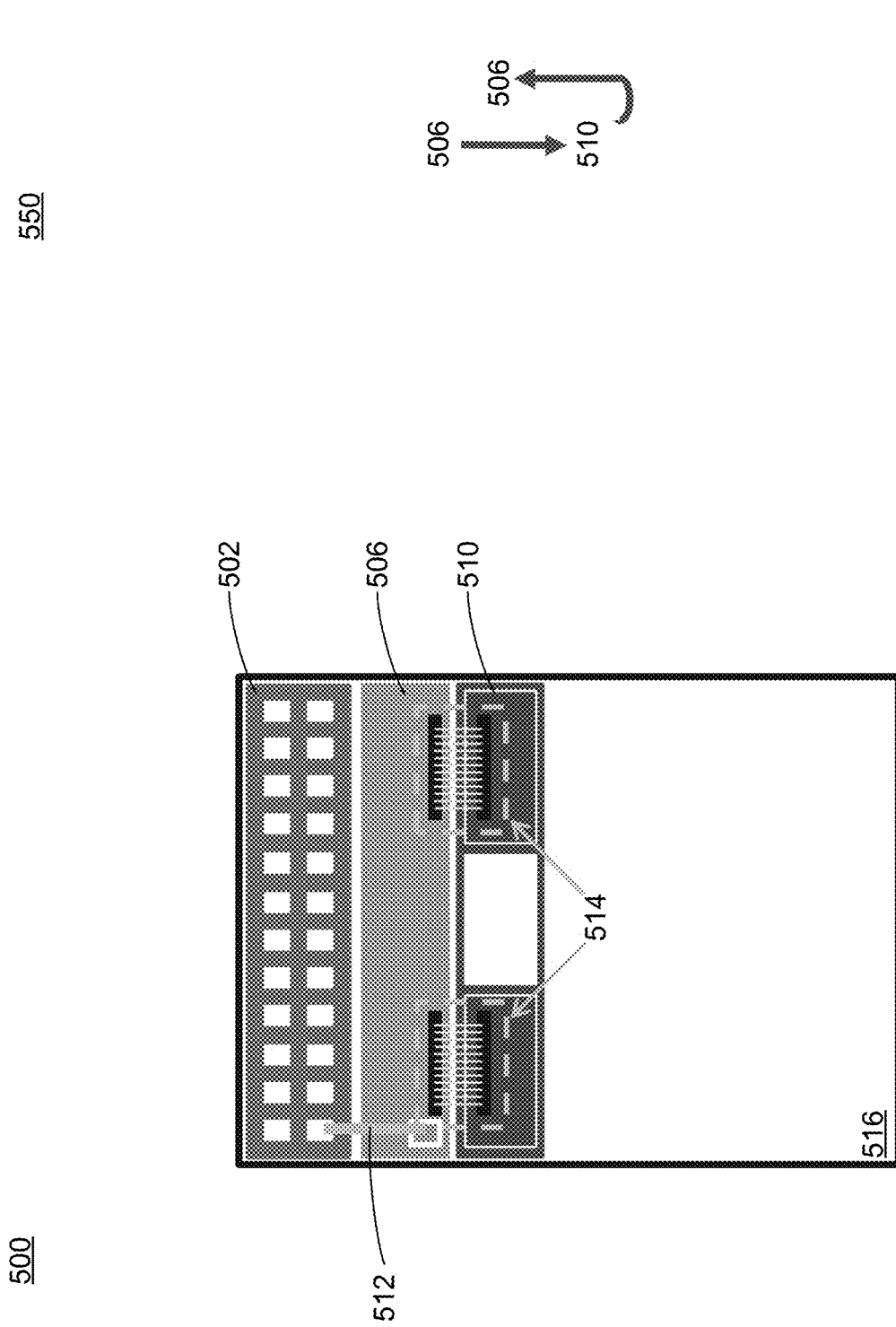
FIGS. 5A-B show an example access path for a read request from a server directly attached to a memory appliance, in accordance with various embodiments.

FIG. 3 shows an example rack with a server directly attached to a memory appliance, in accordance with various embodiments. FIG. 3 depicts a rack 316 comprising a network switch 302 (e.g., network switch 102), servers 306a-b (e.g., server 106), and a memory appliance 320 (e.g., the memory system 110). The servers 306a-b are communicatively coupled via network cables 312 (e.g., Ethernet) and the network switch 302. The memory appliance 320 is directly coupled to the server 306b with the PCIe cables 314. The server 306b can control access by the server 306a to the memory appliance 320.

FIGS. 4A-B show an example access path for a read request from a server to a network attached memory appliance, in accordance with various embodiments. FIG. 4A depicts the components 400 of a rack 416 involved in a read request sent from a server 406 (e.g., the server 106) and handled by a memory appliance server 408 (e.g., the memory appliance server 108) and the memory system 410 (e.g., the memory system 110). The rack 416 includes network switch 402 (e.g., the network switch 102), the server 406, the memory appliance server 408, and the memory system 410. The network switch 402 communicatively couples the server 406 and the memory appliance server 408 via network cables 412 (e.g., the network cable 112). In some embodiments, the memory appliance server 408 and the memory system 410 are communicatively coupled via PCIe cables 414 thereby enabling functionality as a memory appliance.

Referring to FIG. 4B, FIG. 4B depicts a data flow 450 of request and response data in response to processing of the read request. A read request is sent from the server 406 to the network switch 402 which then sends the request to the memory appliance server 408. The memory appliance server 408 receives and processes the read request, and performs access to the data requested in the read request from the memory system 410. The response to the read request is sent from the memory appliance server 408 to the network switch 402 and to the server 406.

FIGS. 5A-B show an example access path for a read request from a server directly attached to a memory appliance, in accordance with various embodiments. FIG. 5A depicts the components 500 of a rack 516 involved in a read request sent from a server 506 (e.g., the server 106) connected directly to a memory system 510 (e.g., the memory system 110). The rack 516 includes network switch 502 (e.g., the network switch 102), the server 506, and the memory system 510. The network switch 502 is communicatively coupled with the server 506 via a network cable 512. In some embodiments, the server 506 and the memory system 510 are communicatively coupled via PCIe cables 514 thereby expanding the memory resources available to the server 506.

Referring to FIG. 5B, FIG. 5B depicts a data flow 550 of request and response data in the handling of the read request. A read request is sent from the server 506 to the memory system 510 (e.g., via the PCIe cables 514). The memory system 510 responds by sending the requested data back to the server 506 (e.g., via the PCIe cables 514).

Figure 6:
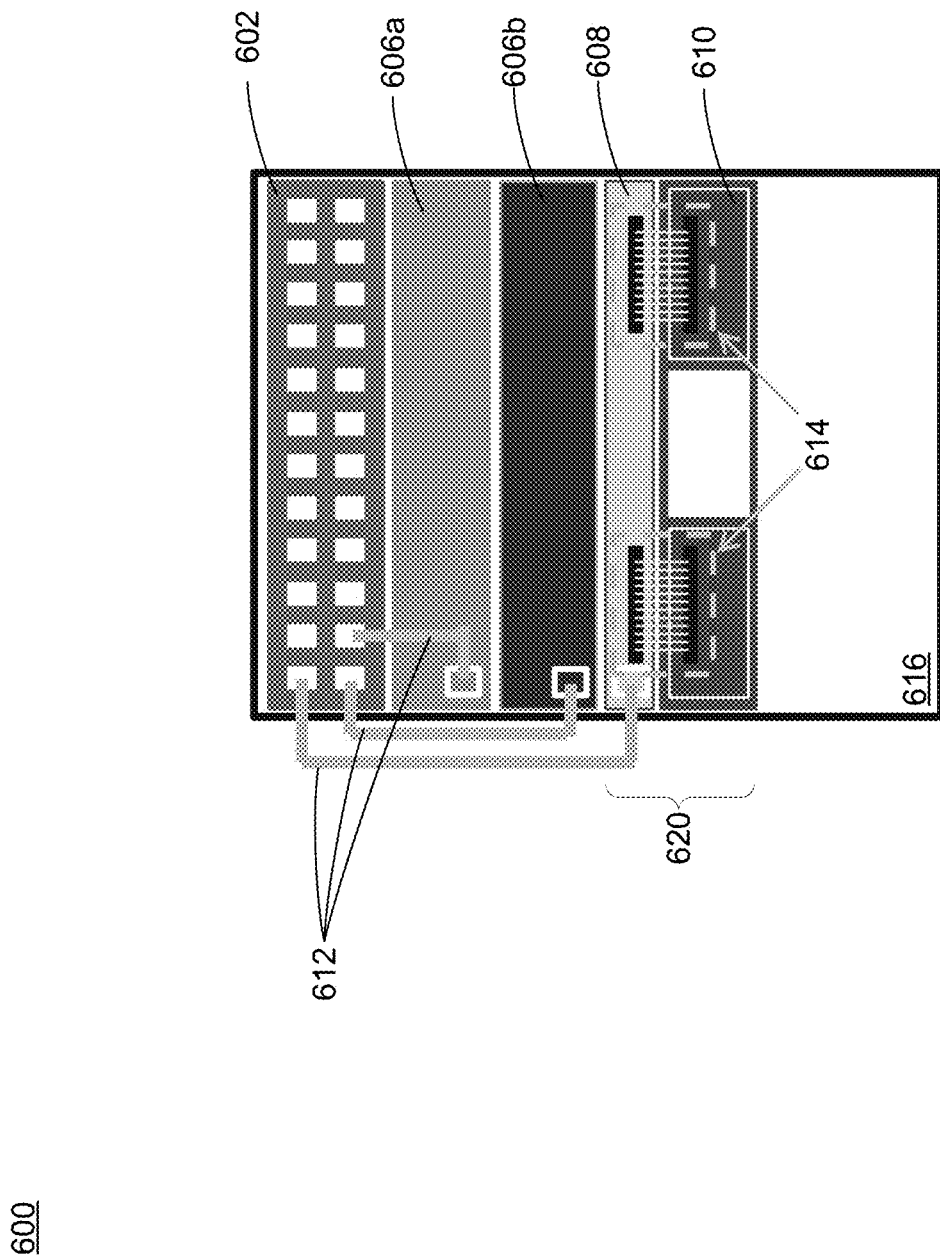
FIG. 6 shows a single server coupled to a single memory appliance via a network, in accordance with various embodiments.

FIG. 6 shows a single server coupled to a single memory appliance via a network, in accordance with various embodiments. FIG. 6 depicts an example rack 616 comprising a network switch 602 (e.g., the network switch 102), servers 606a-b (e.g., the server 106), and a memory appliance 620 comprising a memory appliance server 608 (e.g., the memory appliance server 108) and a memory system 610 (e.g., the memory system 110). The servers 606a-b and the memory appliance 620 are communicatively coupled via network cables 612 (e.g., Ethernet) and the network switch 602. The memory appliance server 608 and the memory system 610 are communicatively coupled by the PCIe cables 614.

In some embodiments, the memory appliance server 608 allows only the server 606a to access the memory system 610. The memory appliance server 608 can keep track of which server is allowed to communicate with the memory system 610 and use the memory system 610. The memory appliance server 608 can prevent other servers in the rack 616, e.g., the server 606b, from accessing the memory system 610. The server with access to the memory system 610, e.g., server 606a, can be in the same rack or a different rack from the memory system 610.

Figure 7:
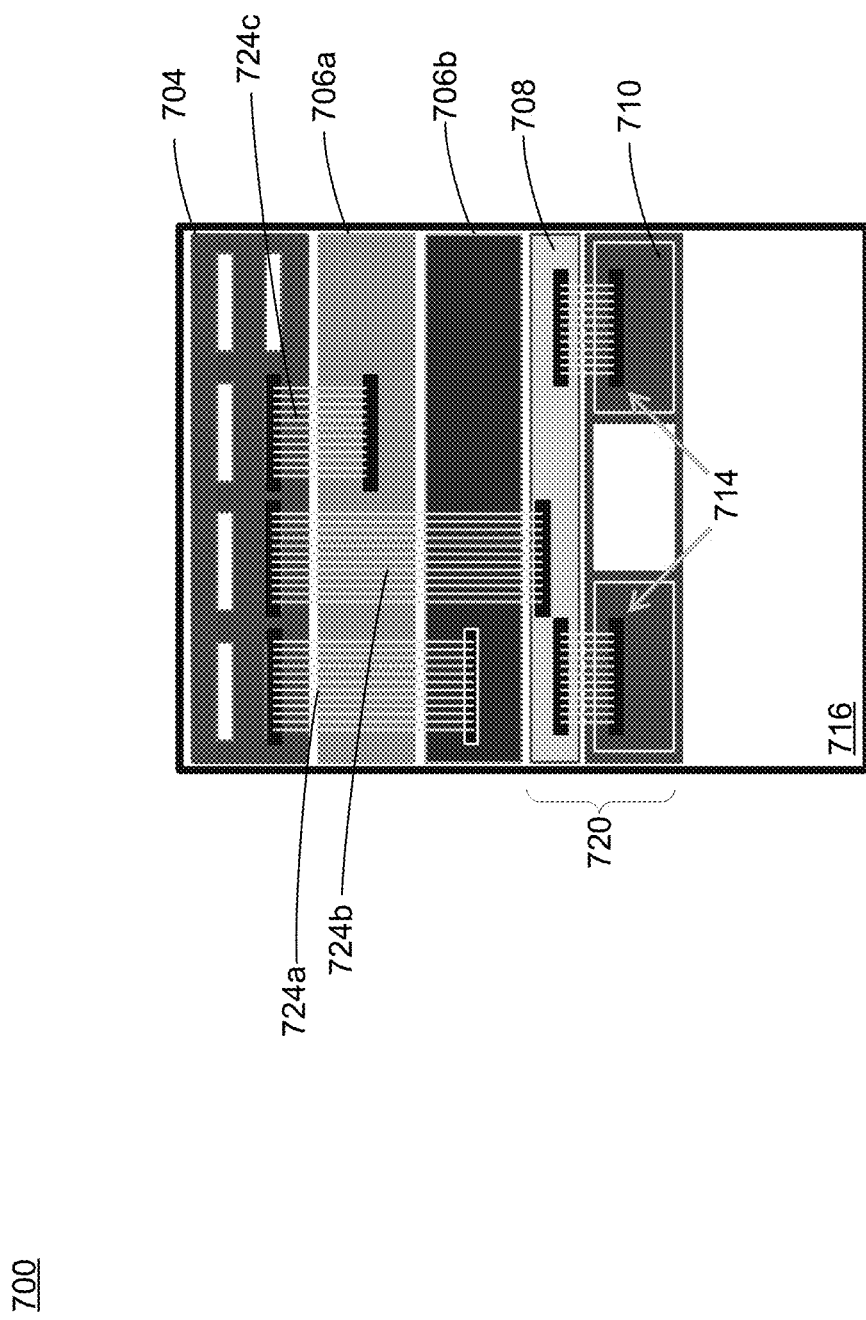
FIG. 7 shows a single server coupled to a single memory appliance via a Peripheral Component Interconnect Express (PCIe) switch, in accordance with various embodiments.

FIG. 7 shows a single server coupled to a single memory appliance via a PCIe switch, in accordance with various embodiments. FIG. 7 depicts a rack 716 comprising a PCIe switch 704 (e.g., PCIe switch 104), servers 706a-b (e.g., the server 106), and a memory appliance 720 comprising a memory appliance server 708 (e.g., the memory appliance server 108) and a memory system 710 (e.g., the memory system 110). The servers 706a-b and the memory appliance 720 are communicatively coupled via PCIe cables 724a-c and the PCIe switch 704. The memory appliance server 708 and the memory system 710 are communicatively coupled by the PCIe cables 714.

In some embodiments, the memory appliance server 708 allows only the server 706a to access the memory system 710. The memory appliance server 708 can keep track of which server is allowed to communicate with the memory system 710 and use the memory system 710 via authorization data. The memory appliance server 708 can prevent other servers in the rack 716, e.g., the server 706b, from accessing the memory system 710. The server with access to the memory system 710, e.g., server 706a, can be in the same rack or a different rack from the memory system 710 if the racks are communicatively coupled through a network or a switch of some type.

Figure 8:
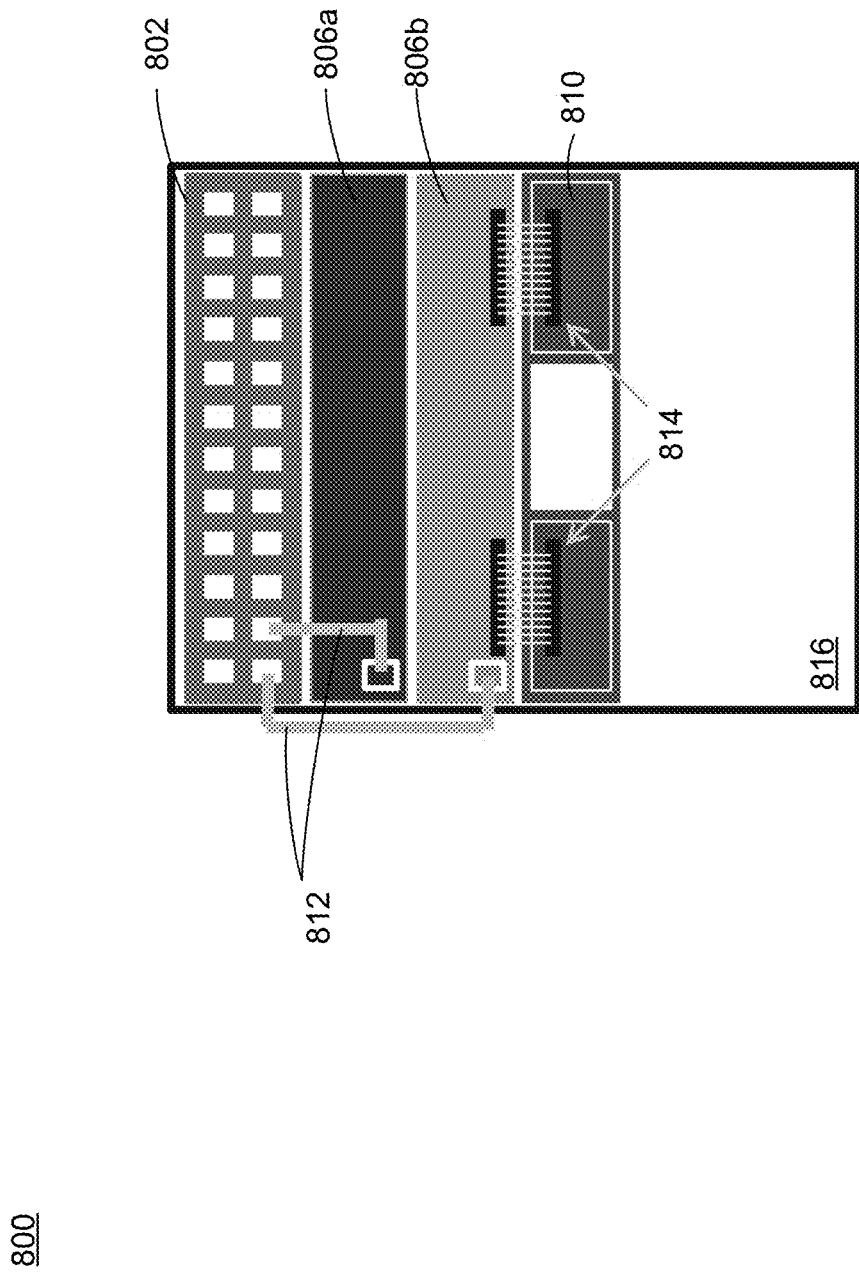
FIG. 8 shows a single server coupled to a single memory appliance via PCIe, in accordance with various embodiments.

FIG. 8 shows a single server coupled to a single memory appliance via PCIe, in accordance with various embodiments. FIG. 8 depicts an example rack 816 comprising a network switch 802 (e.g., the network switch 102), servers 806a-b (e.g., the server 106), and a memory system 810 (e.g., the memory system 110). The servers 806a-b are communicatively coupled via network cables 812 (e.g., Ethernet) and the network switch 802. The memory appliance 820 is directly connected to the server 806b with the PCIe cables 814.

In some embodiments, the direct connection (e.g., via PCIe cables 814) allows only the server 806b to access the memory of the memory system 810. The server 806b directly attached to the memory system 810 can prevent other servers, e.g., the server 806a, from accessing the memory system 810.

Figure 9:
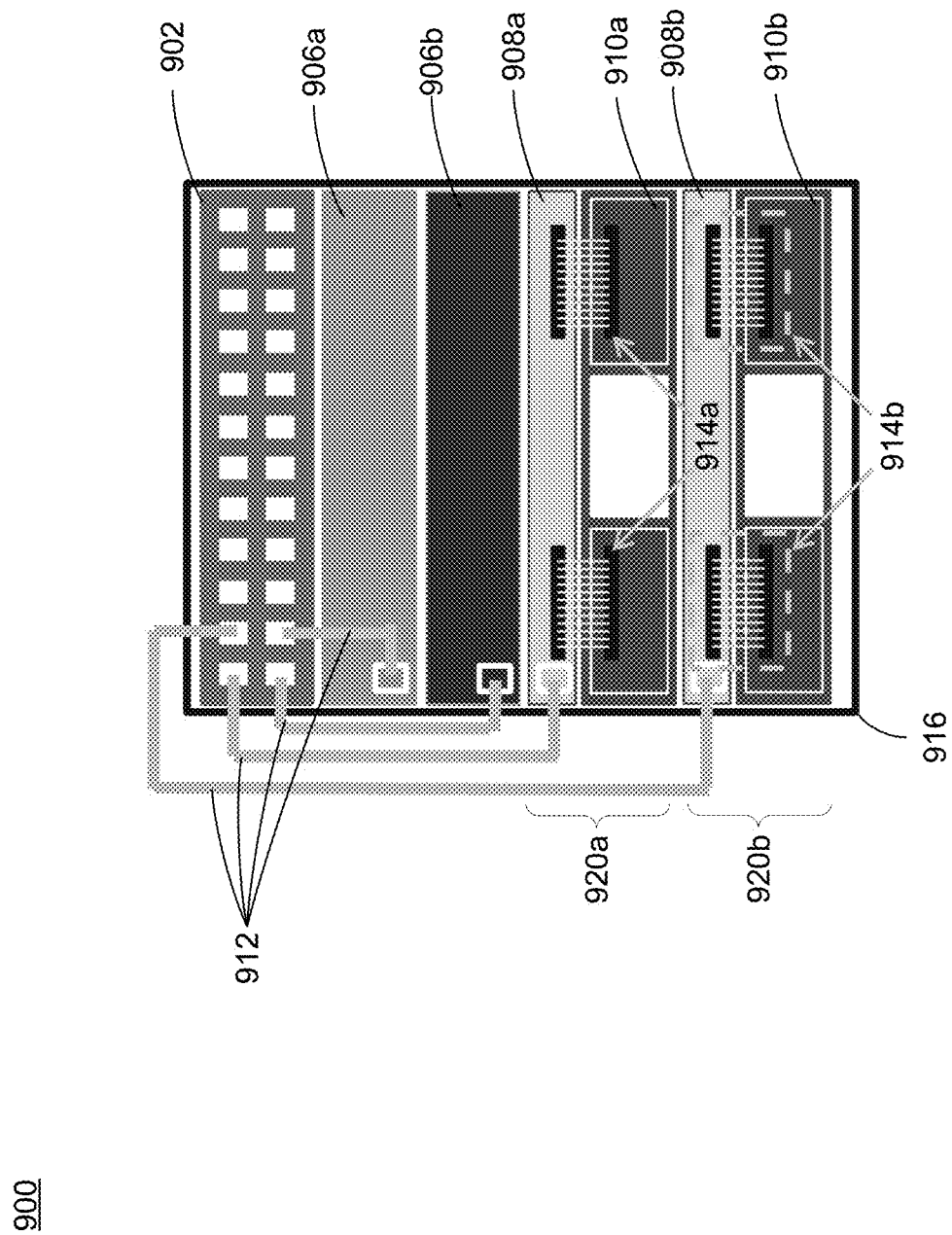
FIG. 9 shows a single server coupled to multiple memory appliances via a network, in accordance with various embodiments.

FIG. 9 shows a single server coupled to multiple memory appliances via a network, in accordance with various embodiments. FIG. 9 depicts an example rack 916 comprising a network switch 902 (e.g., network switch 102), servers 906a-b (e.g., server 106), and memory appliances 920a-b. The memory appliances 920a-b comprise memory appliance servers 908a-b (e.g., memory appliance server 108) and a memory systems 910a-b (e.g., the memory system 110). The servers 906a-b and the memory appliance servers 908a-b are communicatively coupled via network cables 912 (e.g., Ethernet) and the network switch 902. The memory appliance server 908a is communicatively coupled (e.g., directly) to the memory system 910a via PCIe cables 914a and memory appliance server 908b is communicatively coupled (e.g., directly) to the memory system 910b via PCIe cables 914b.

In some embodiments, the memory appliance servers 908a-b allow only the server 906a to access data of the memory systems 910a-b. The memory appliance servers 908a-b can keep track of which server is allowed to communicate with the memory systems 910a-b and use the memory systems 910a-b via authorization data. The memory appliance servers 908a-b can prevent other servers in the rack 916, e.g., the server 906b, from accessing the memory systems 910a-b. The servers with access to the memory systems 910a-b, e.g., the server 906a, can be in the same rack or a different rack from the memory systems 910a-b.

Figure 10:
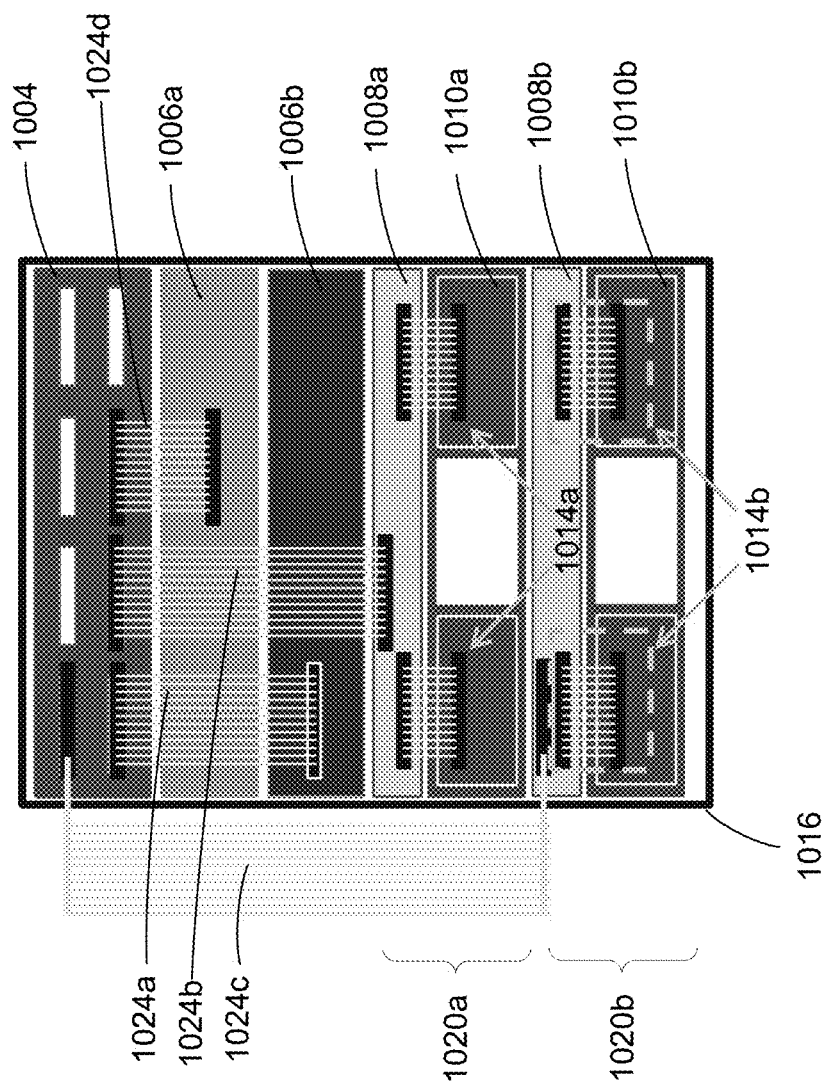
FIG. 10 shows a single server coupled to multiple memory appliances via a PCIe switch, in accordance with various embodiments.

FIG. 10 shows a single server coupled to multiple memory appliances via a PCIe switch, in accordance with various embodiments. FIG. 10 depicts an example rack 1016 comprising a PCIe switch 1004 (e.g., PCIe switch 104), servers 1006a-b (e.g., the server 106), and memory appliances 1020a-b. The memory appliances 1020a-b comprise memory appliance servers 1008a-b (e.g., the memory appliance server 108) and memory systems 1010a-b (e.g., the memory system 110). The servers 1006a-b and the memory appliance servers 1008a-b are coupled via PCIe cables 1024a-d and the PCIe switch 1004. The memory appliance server 1008a and the memory system 1010a are communicatively coupled (e.g., directly) by the PCIe cables 1014a. The memory appliance server 1008b and the memory system 1010b are communicatively coupled (e.g., directly) by the PCIe cables 1014b.

In some embodiments, the memory appliance servers 1008a-b allow only the server 1006a to access the memory systems 1010a-b. The memory appliance servers 1008a-b can keep track of which server is allowed to communicate with the memory systems 1010a-b and use the memory systems 1010a-b via authorization data. The memory appliance server 1008a-b can prevent other servers in the rack 1016, e.g., the server 1006b, from accessing the memory systems 1010a-b. The server with access to the memory systems 1010a-b, e.g., server 1006a, can be in the same rack or a different rack from the memory systems 1010a-b if the racks are communicatively coupled through a network or a switch of some type.

Figure 11:
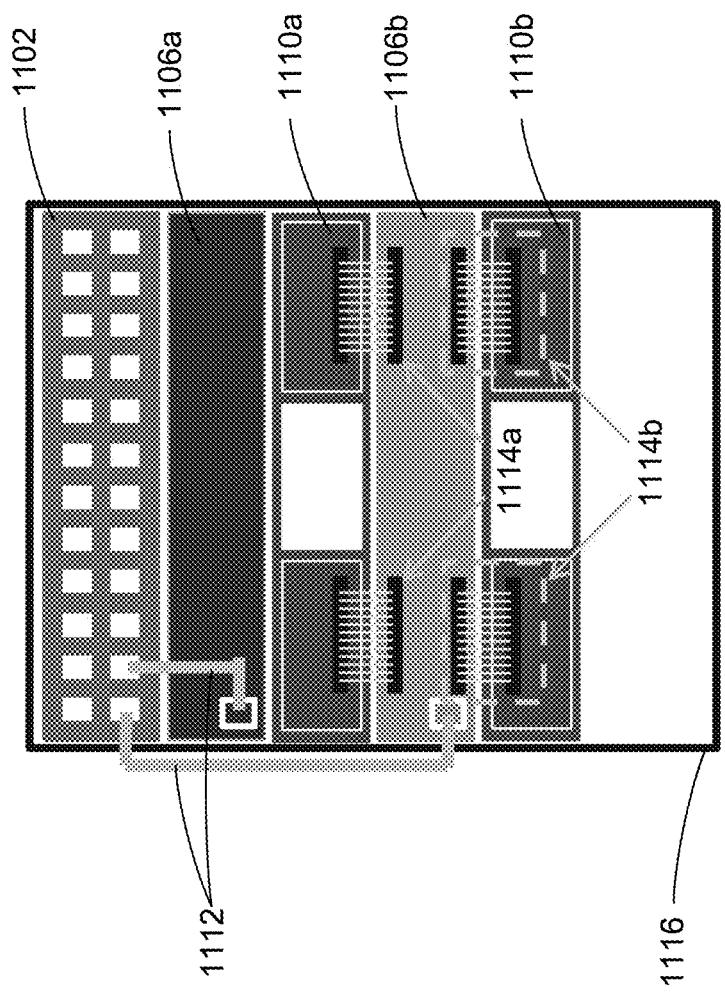
FIG. 11 shows a single server coupled to multiple memory appliances via PCIe, in accordance with various embodiments.

FIG. 11 shows a single server coupled to multiple memory appliances via PCIe, in accordance with various embodiments. FIG. 11 depicts an example rack 1116 comprising a network switch 1102 (e.g., the network switch 102), servers 1106a-b (e.g., the server 106), and memory systems 1110a-b (e.g., the memory system 110). The servers 1106a-b are communicatively coupled (e.g., directly) via network cables 1112 (e.g., Ethernet) and the network switch 1102. The server 1106b is coupled to the memory system 1110a by PCIe cables 1114a and coupled to the memory system 1110b by PCIe cables 1114b.

In some embodiments, the direct connection of the server 1106b to the memory systems 1110a-b allows only the server 1106b to access the memory systems 1110a-b. The server 1106b can prevent other servers in the rack 1116, e.g., the server 1106a, from accessing the memory systems 1110a-b.

Figure 12:
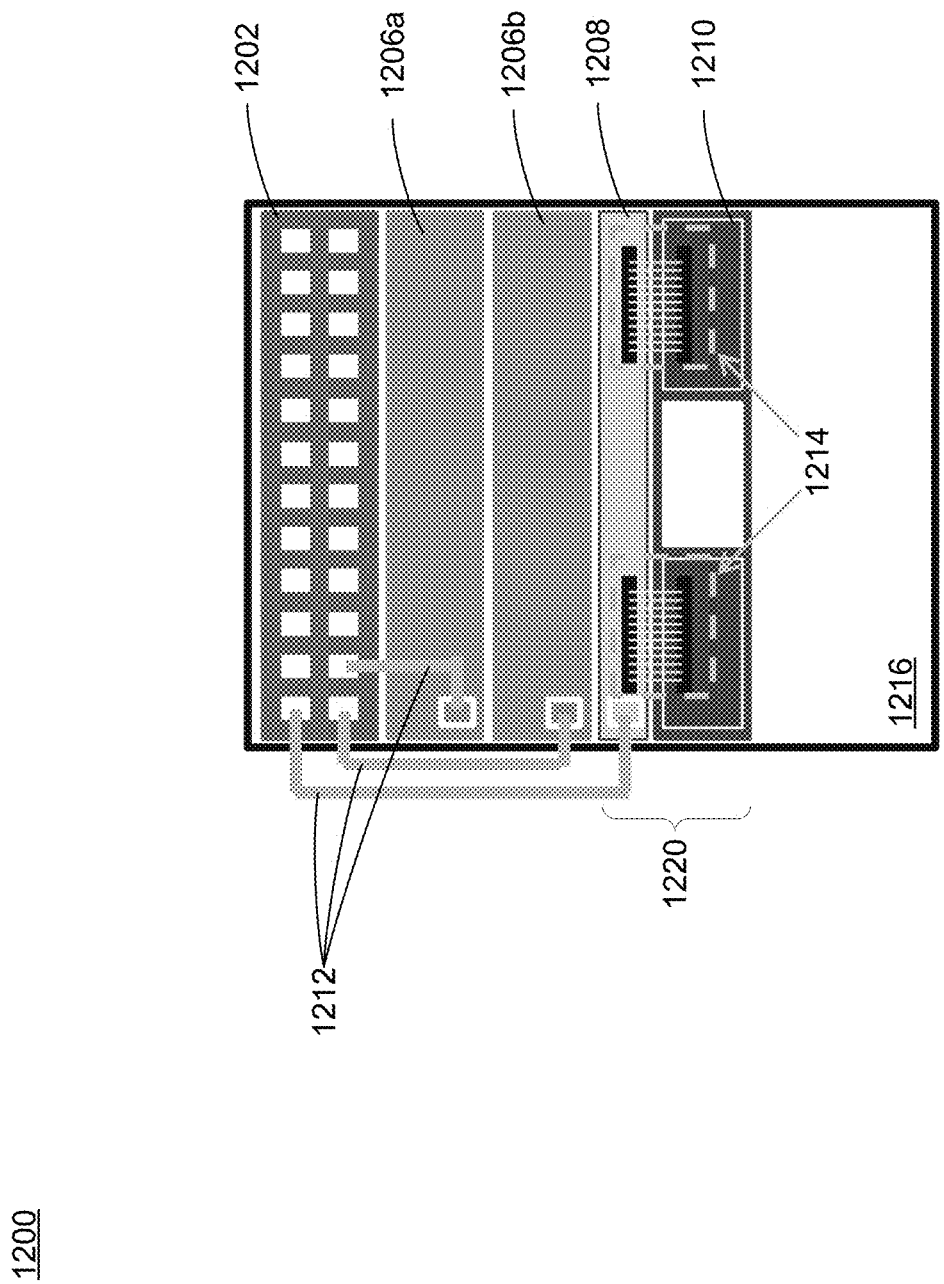
FIG. 12 shows multiple servers coupled to a single memory appliance via a network, in accordance with various embodiments.

FIG. 12 shows multiple servers coupled to a single memory appliance via a network, in accordance with various embodiments. FIG. 12 depicts an example rack 1216 comprising a network switch 1202 (e.g., network switch 102), servers 1206a-b (e.g., the server 106), and a memory appliance 1220 comprising a memory appliance server 1208 (e.g., memory appliance server 108) and a memory system 1210 (e.g., the memory system 110). The servers 1206a-b and the memory appliance 1220 are communicatively coupled via network cables 1212 (e.g., Ethernet) and the network switch 1202. The memory appliance server 1208 and the memory system 1210 are communicatively coupled (e.g., directly) by the PCIe cables 1214.

In some embodiments, the memory appliance server 1208 allows the servers 1206a-b to access the memory system 1210. The memory appliance server 1208 can keep track of which servers are allowed to communicate with the memory system 1210, use the memory system 1210, and which memory partition(s) (e.g., of the memory system 1210) each server is allowed to access. The memory appliance server 1208 can prevent other servers in the rack 1216 from accessing the memory system 1210. The servers with access to the memory system 1210, e.g., the servers 1206a-b, can be in the same rack, in a different racks, or split with some in the same rack and others in different racks from the memory system 1210.

Figure 13:
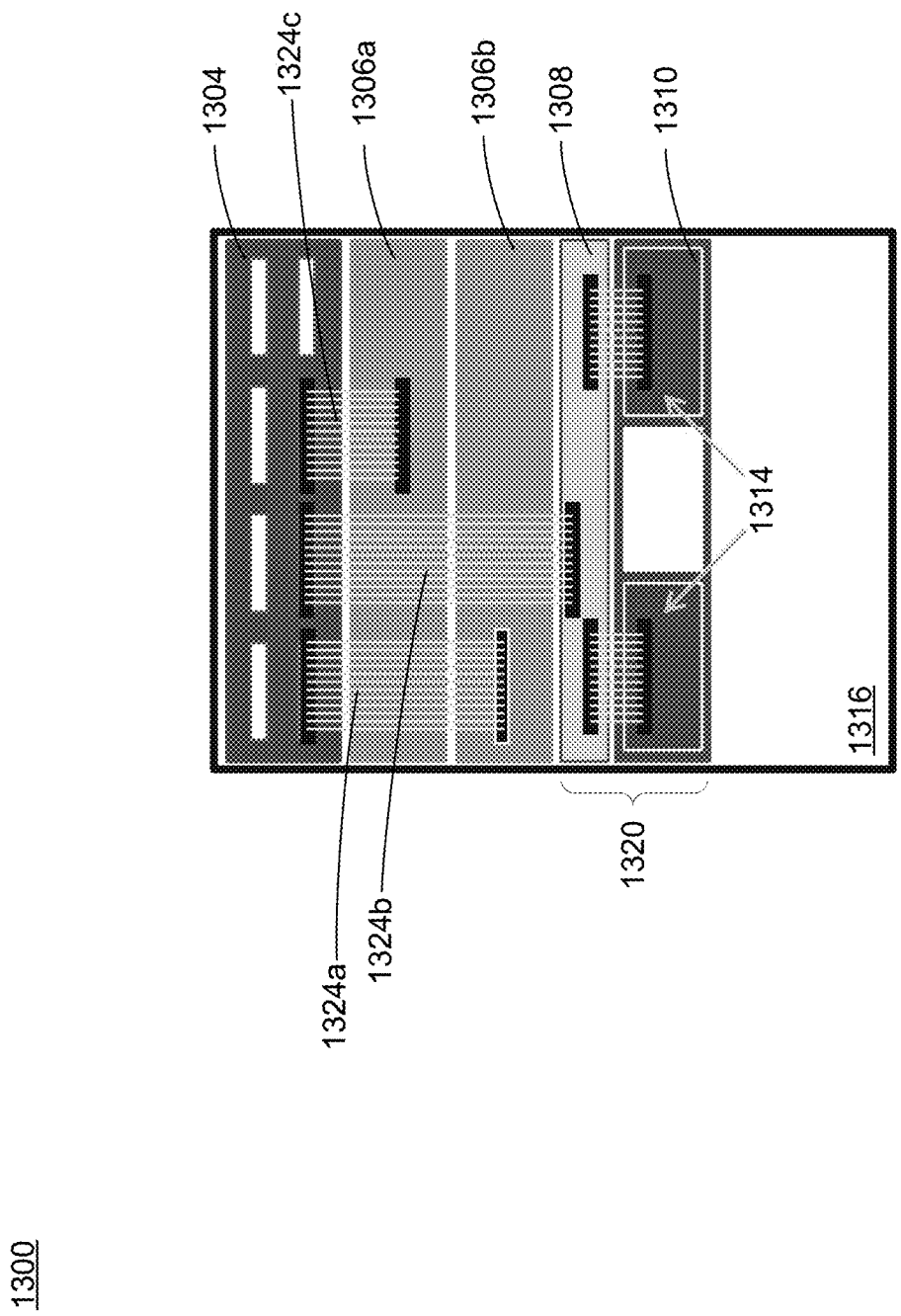
FIG. 13 shows multiple servers coupled to a single memory appliance via a PCIe switch, in accordance with various embodiments.

FIG. 13 shows multiple servers coupled to a single memory appliance via a PCIe switch, in accordance with various embodiments. FIG. 13 depicts an example rack 1316 comprising a PCIe switch 1304 (e.g., PCIe switch 104), servers 1306a-b (e.g., the server 106), and a memory appliance 1320 comprising a memory appliance server 1308 (e.g., memory appliance server 108) and a memory system 1310 (e.g., the memory system 110). The servers 1306a-b and the memory appliance 1320 are communicatively coupled via PCIe cables 1324a-c and the PCIe switch 1304. The memory appliance server 1308 and the memory system 1310 are communicatively coupled (e.g., directly) by the PCIe cables 1314.

In some embodiments, the memory appliance server 1308 allows the servers 1306a-b to access the memory system 1310. The memory appliance server 1308 can keep track of which servers are allowed to communicate with the memory system 1310, use the memory system 1310, and which memory partition(s) (e.g., of the memory system 1310) each server is allowed to access. The memory appliance server 1308 can prevent other servers in the rack 1316 from accessing the memory system 1310. The servers with access to the memory system 1310, e.g., the servers 1306a-b, can be in the same rack, in a different racks, or split with some in the same rack and others in different racks (e.g., with racks coupled through a network or switch of some type) from the memory system 1310.

Figure 14:
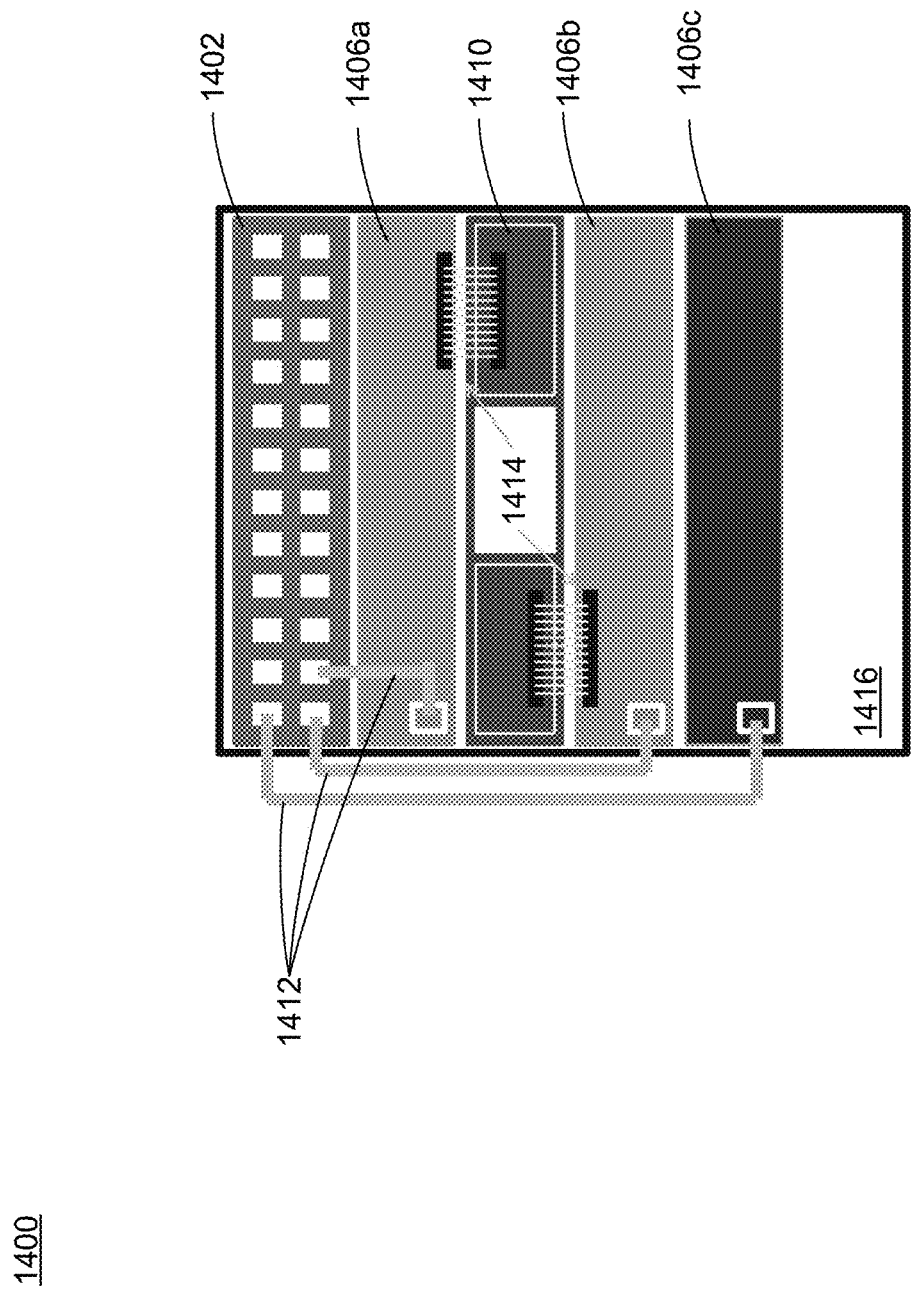
FIG. 14 shows multiple servers coupled to a single memory appliance via PCIe, in accordance with various embodiments.

FIG. 14 shows multiple servers coupled to a single memory appliance via PCIe, in accordance with various embodiments. FIG. 14 depicts an example rack 1416 comprising a network switch 1402 (e.g., the network switch 102), servers 1406a-c (e.g., the server 106), and a memory system 1410 (e.g., the memory system 110). The servers 1406a-c are communicatively coupled via network cables 1412 (e.g., Ethernet) and the network switch 1402. The memory system 1410 is directly coupled to the servers 1406a-b with the PCIe cables 1414.

In some embodiments, the direct connection (e.g., via PCIe cables 1414) allows the servers 1406a-b to access the memory of the memory system 1410. The servers 1406a-b directly attached to the memory system 1410 can prevent other servers, e.g., the server 1406c, from accessing the memory of the memory system 1410. The memory system 1410 can enforce access control rules between servers and the memory system 1410.

Figure 15:
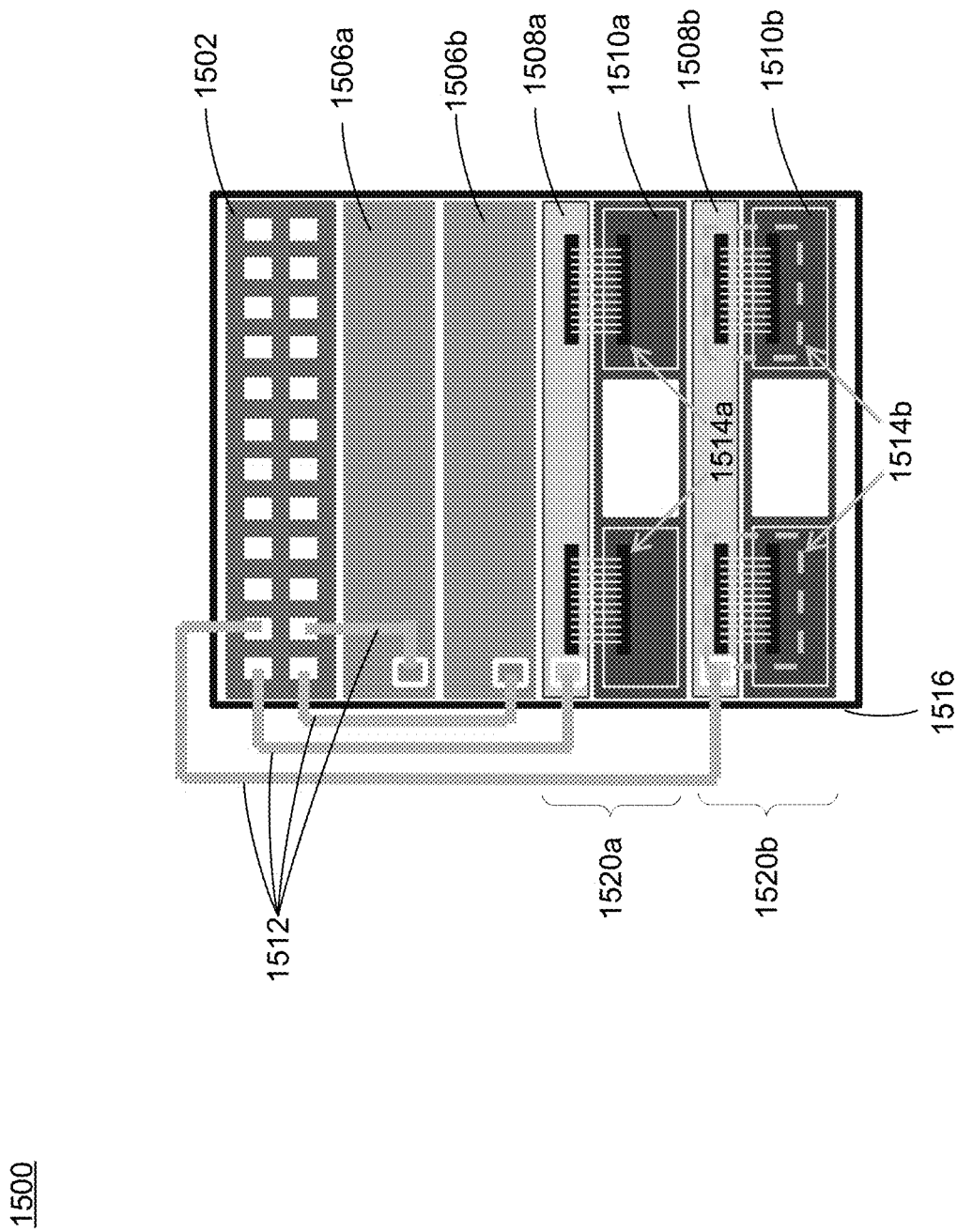
FIG. 15 shows multiple servers coupled to multiple memory appliances via a network, in accordance with various embodiments.

FIG. 15 shows multiple servers coupled to multiple memory appliances via a network, in accordance with various embodiments. FIG. 15 depicts an example rack 1516 comprising a network switch 1502 (e.g., the network switch 102), servers 1506a-b (e.g., server 106), and memory appliances 1520a-b. The memory appliances 1520a-b comprises memory appliance servers 1508a-b (e.g., memory appliance server 108), and memory systems 1510a-b (e.g., the memory system 110). The servers 1506a-b and the memory appliance servers 1508a-b are communicatively coupled via network cables 1512 (e.g., Ethernet) and the network switch 1502. The memory appliance server 1508a is communicatively coupled (e.g., directly) to the memory system 1510a via PCIe cables 1514a and memory appliance server 1508b is communicatively coupled (e.g., directly) to the memory system 1510b via PCIe cables 1514b.

In some embodiments, the memory appliance servers 1508a-b allow the servers 1506a-b to access data of the memory systems 1510a-b. The memory appliance servers 1508a-b can keep track of which servers are allowed to communicate with the memory systems 1510a-b, use the memory system 1510a-b, and which memory partition(s), if any, each server is allowed to access. The memory appliance servers 1508a-b can prevent other servers in the rack 1516 from accessing the memory systems 1510a-b. The servers with access to the memory systems 1510a-b, e.g., server 1506a-b, can be in the same rack or a different rack from the memory systems 1510a-b.

Figure 16:
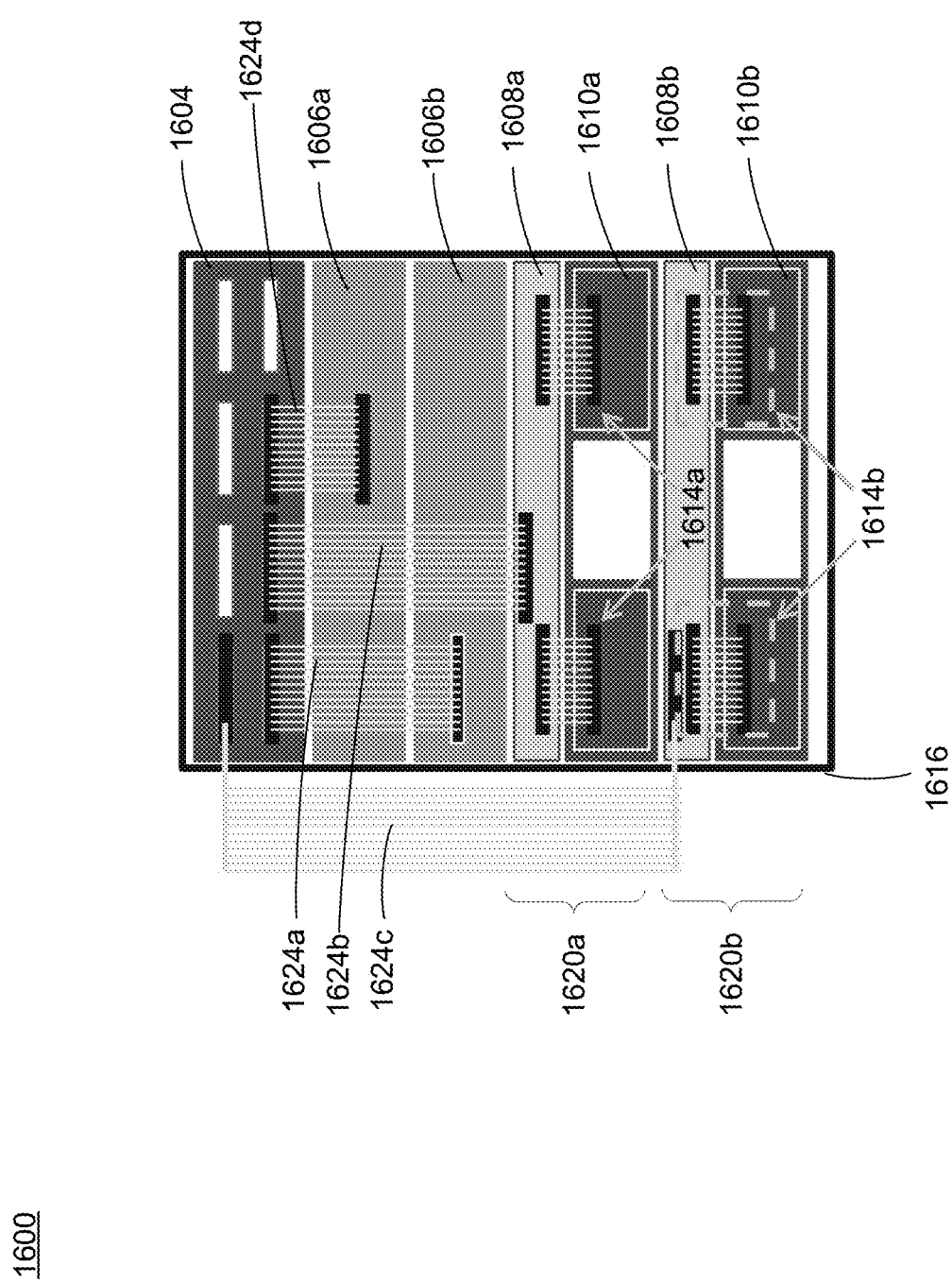
FIG. 16 shows multiple servers coupled to multiple memory appliances via a PCIe switch, in accordance with various embodiments.

FIG. 16 shows multiple servers coupled to multiple memory appliances via a PCIe switch, in accordance with various embodiments. FIG. 16 depicts an example rack 1616 comprising a PCIe switch 1604 (e.g., the PCIe switch 104), servers 1606a-b (e.g., the server 106), and memory appliances 1620a-b. The memory appliances 1620a-b comprises memory appliance servers 1608a-b (e.g., the memory appliance server 108), and memory systems 1610a-b (e.g., the memory system 110). The servers 1606a-b and the memory appliance servers 1608a-b are communicatively coupled via PCIe cables 1624a-d and the PCIe switch 1604. The memory appliance server 1608a and the memory system 1610a are communicatively coupled (e.g., directly) by the PCIe cables 1614a. The memory appliance server 1608b and the memory system 1610b are communicatively coupled (e.g., directly) by the PCIe cables 1614b.

In some embodiments, the memory appliance servers 1608a-b allow the servers 1606a-b to access the memory systems 1610a-b. The memory appliance servers 1608a-b can keep track of which servers are allowed to communicate with the memory systems 1610a-b, use the memory systems 1610a-b, and which memory partition(s), if any, the servers are allowed to access. The memory appliance servers 1608a-b can prevent other servers in the rack 1616 from accessing the memory systems 1610a-b. The servers with access to the memory systems 1610a-b, e.g., the servers 1606a-b, can be in the same rack or a different rack from the memory systems 1610a-b if the racks are communicatively coupled through a network or a switch of some type.

Figure 17:
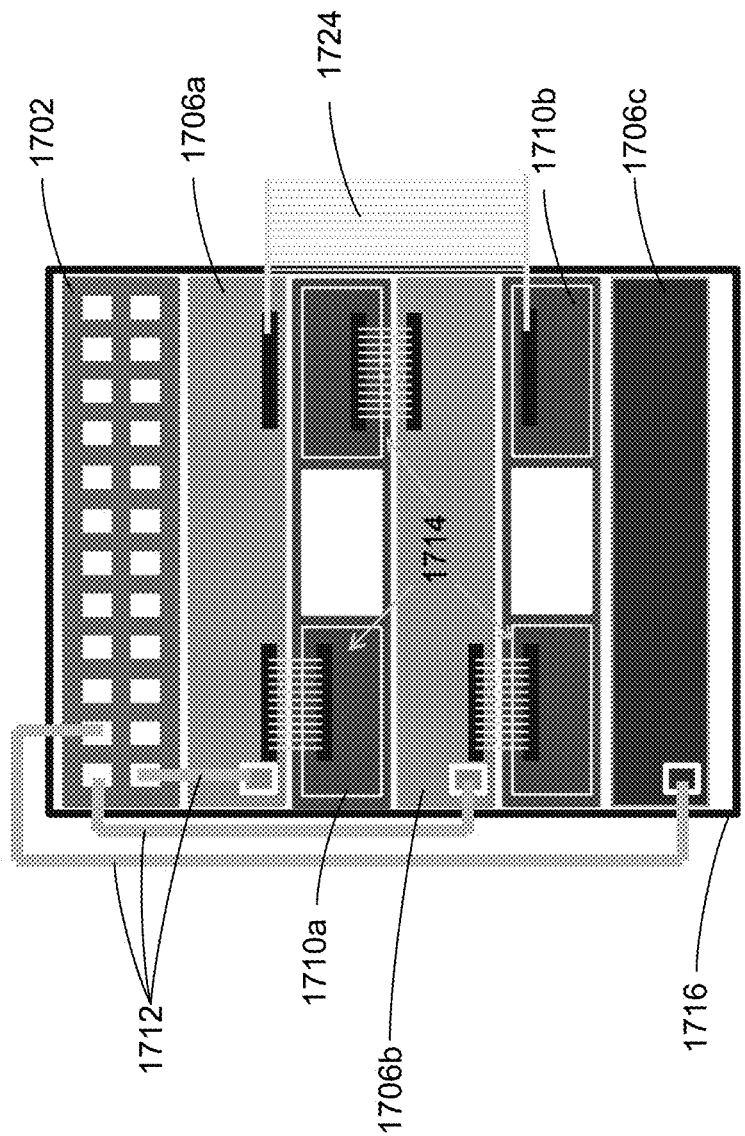
FIG. 17 shows multiple servers coupled to multiple memory appliances via PCIe, in accordance with various embodiments.

FIG. 17 shows multiple servers coupled to multiple memory appliances via PCIe, in accordance with various embodiments. FIG. 17 depicts an example rack 1716 comprising a network switch 1702 (e.g., the network switch 102), servers 1706a-c (e.g., the server 106), and memory system 1710a-b (e.g., the memory system 110). The servers 1706a-c are communicatively coupled via network cables 1712 (e.g., Ethernet) and the network switch 1702. The memory systems 1710a-b are directly coupled to the servers 1706a-b with the PCIe cables 1714 and 1724.

In some embodiments, the direct connections (e.g., via PCIe cables 1714 and 1724) allow the servers 1706a-b to access the memory of the memory systems 1710a-b. The servers 1706a-b directly attached to the memory systems 1710a-b can prevent other servers, e.g., the server 1706c, from accessing the memory of the memory systems 1710a-b. The memory systems 1710a-b can enforce access control rules between servers and the memory systems 1710a-b.

Figure 18:
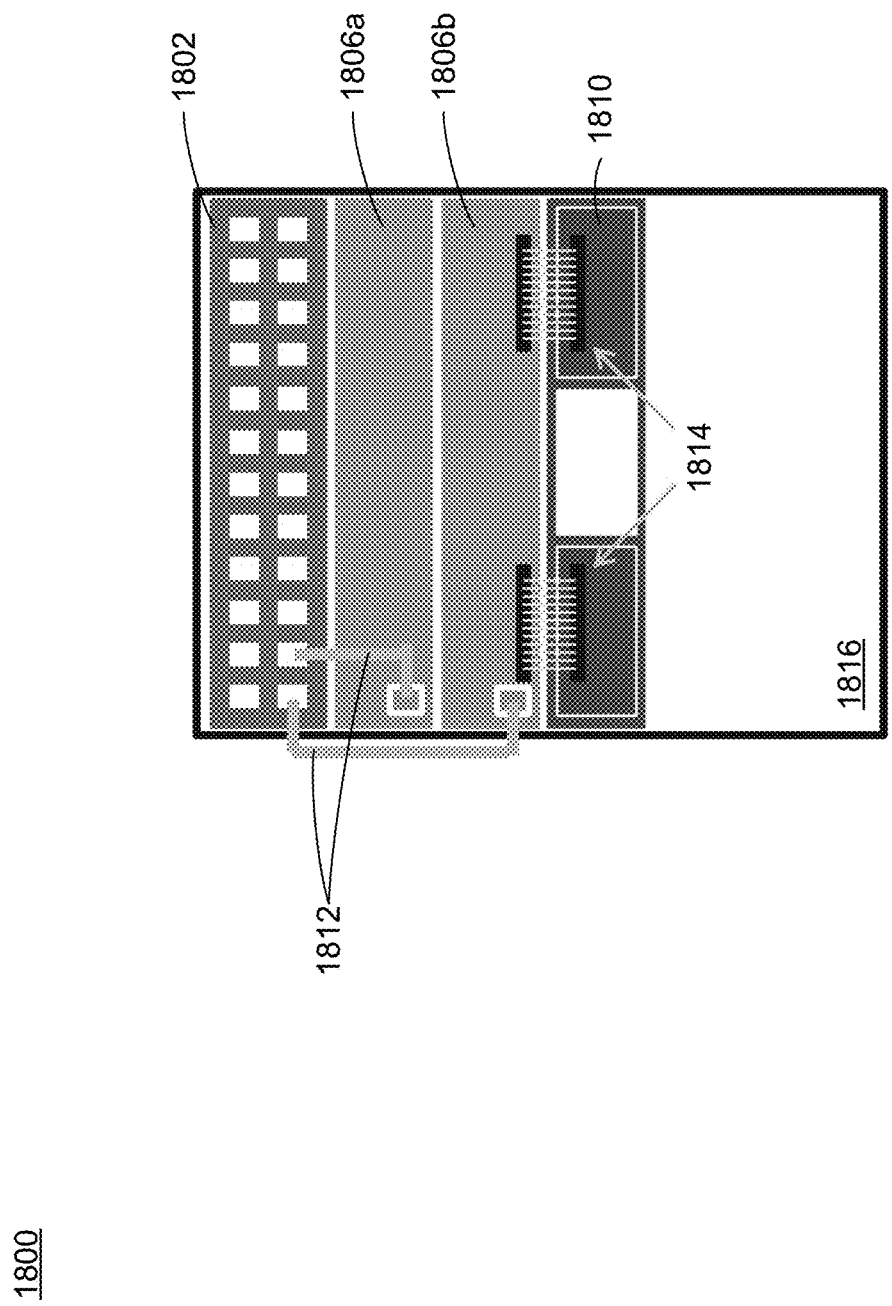
FIG. 18 shows multiple servers coupled via a network to a single memory appliance with a server directly connected to the memory appliance, in accordance with various embodiments.

FIG. 18 shows multiple servers connected via a network to a single memory appliance with a server directly connected to the memory appliance, in accordance with various embodiments. FIG. 18 depicts an example rack 1816 comprising a network switch 1802 (e.g., the network switch 102), servers 1806a-b (e.g., the server 106), and a memory system 1810 (e.g., the memory system 110). The servers 1806a-b are communicatively coupled via network cables 1812 (e.g., Ethernet) and the network switch 1802. The server 1806b and the memory system 1810 are communicatively coupled (e.g., directly) by the PCIe cables 1814.

In some embodiments, the direct connection of the server 1806b to the memory system 1810 allows the server 1806b to access the memory of the memory system 1810 and control access of other servers to the memory system 1810. For example, the server 1806b can limit access to the memory system 1810 to the server 1806a in the system (e.g., the rack 1816). The server 1806b may thus perform some of the functions of a memory appliance server without the presence of a memory appliance server.

Figure 19:
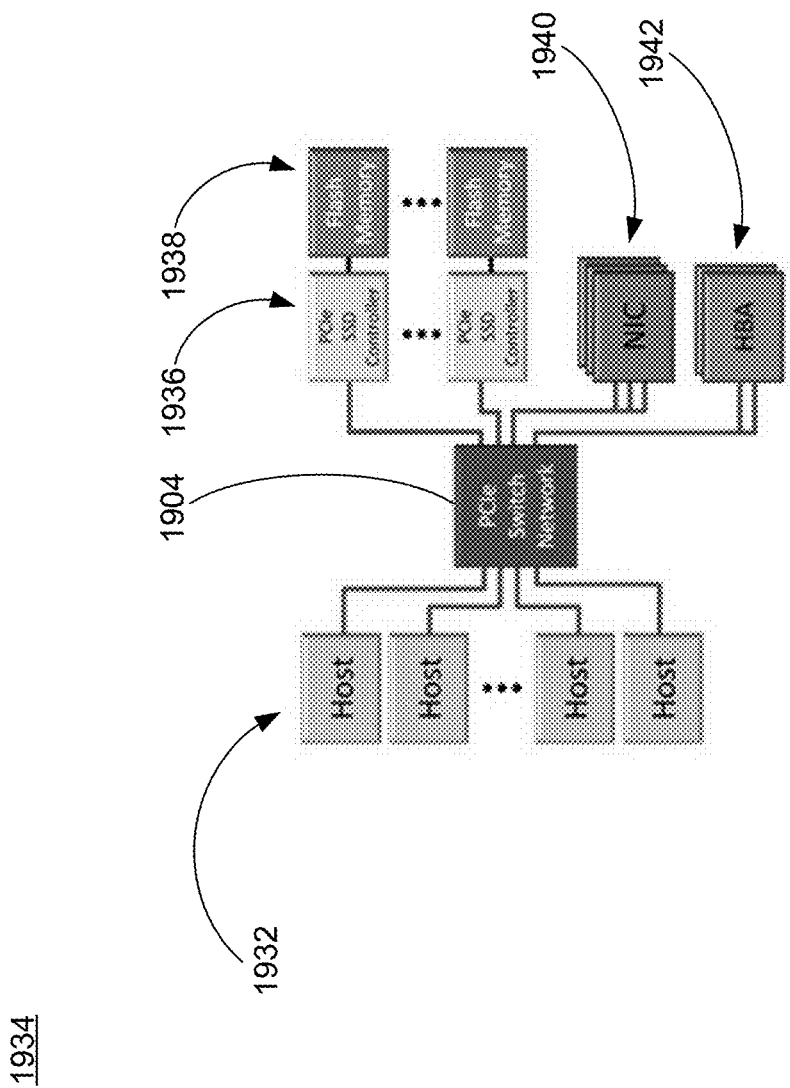
FIG. 19 shows example components of a crossbar interconnect topology, in accordance with various embodiments.

FIG. 19 shows example components of a crossbar interconnect topology, in accordance with various embodiments. FIG. 19 depicts a crossbar interconnect topology 1934 comprising an example PCIe switch 1904 (e.g., PCIe switch 104) configured for coupling one or more servers, multiple PCIe devices, and various peripherals, as described herein. The crossbar interconnect topology 1934 includes a PCIe switch 1904, PCIe SSD controllers 1936, flash memories 1938, NICs 1940, and host bus adapters (HBAs) 1942.

The hosts 1932 can be one or more servers, e.g., the servers 106 and 108. The PCIe switch network 1904 is configured communicatively coupling the hosts 1932 to each other and the PCIe SSD controllers 1936, flash memories 1938, NICs 1940, and host bus adapters (HBAs) 1942.

The PCIe SSD controllers 1936 are configured for allowing access to the flash memories 1938. The flash memories 1938 are configured for storage and access of data stored therein. The NICs 1940 are configured for providing network access to the PCIe switch 1904. The host bus adapters (HBAs) 1942 are configured to couple the PCIe switch 1904 to other network and storage devices.

Figures 20A, 20B:
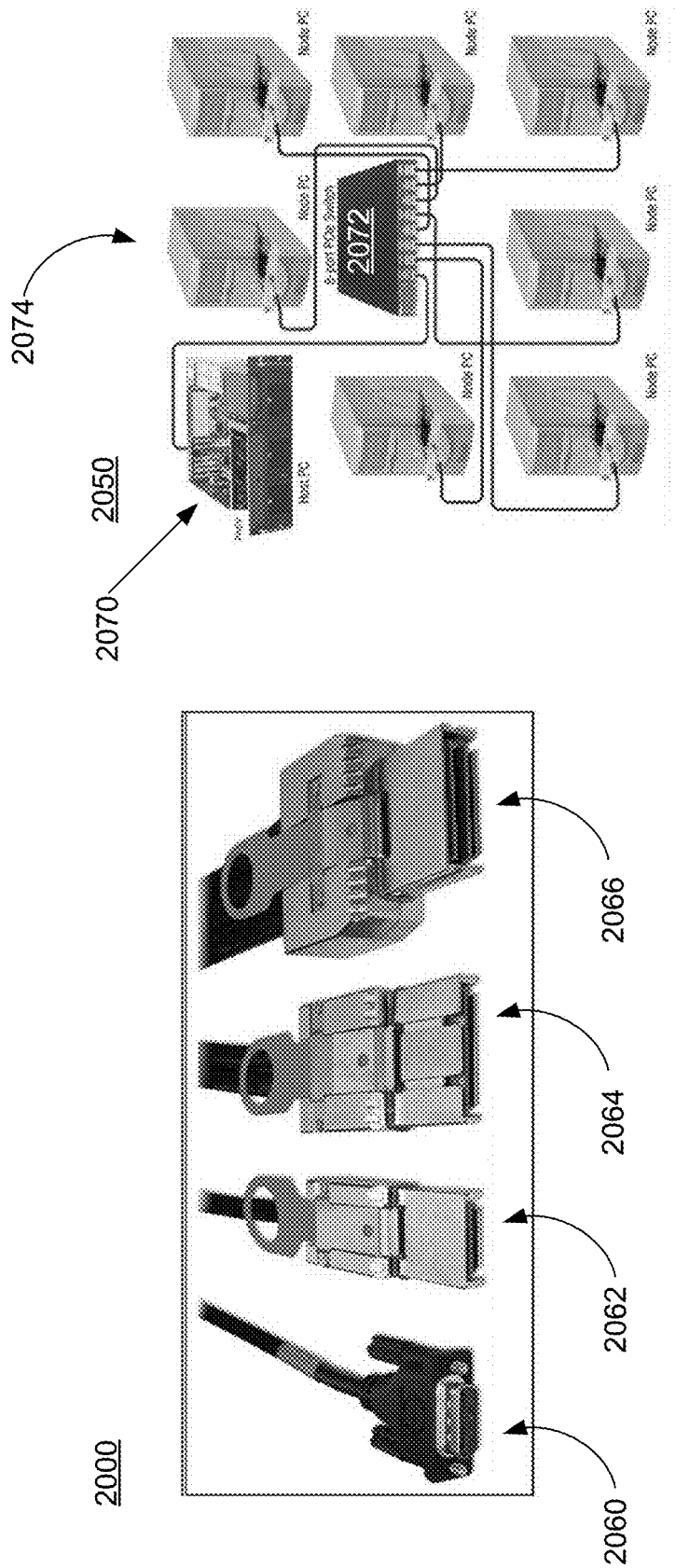
FIGS. 20A-B show example PCIe cables and an example PCIe coupling, in accordance with various embodiments.

FIGS. 20A-B show example PCIe cables and an example PCIe coupling, in accordance with various embodiments. FIG. 20A depicts PCIe cables 2060-2066 with associated connectors. The PCIe cable 2060 supports an ×1 link width. The PCIe cable 2062 supports an ×4 link width. The PCIe cable 2064 supports an ×8 link width. The PCIe cable 2066 supports an ×16 link width for example.

FIG. 20B depicts an example coupling 2050 of a plurality of node PCs 2074 and a host PC 2070 via a PCIe switch 2072. The PCIe switch 2072 may be an 8-port PCIe switch for instance. The coupling 2050 is based on PCIe being used as a high-performance networking architecture, coupling multiple PCs with software transparency to Ethernet.

Referring to FIGS. 21-24, the example data transfers and couplings described and shown in FIGS. 21-24 may be performed and configured according to the devices and component couplings shown in FIGS. 2-18.

Figure 21:
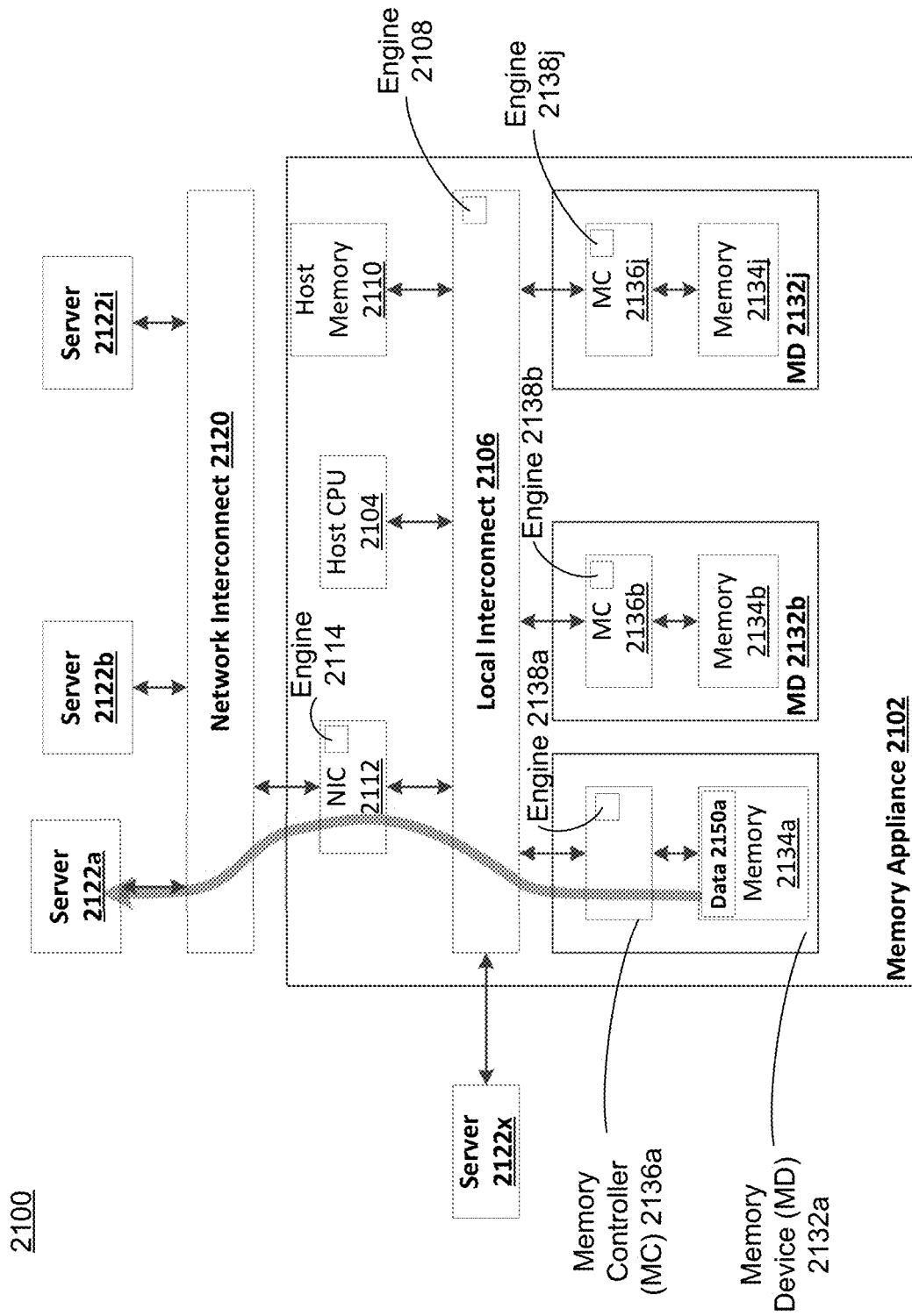
FIG. 21 shows an example data transfer methodology through a network interface card (NIC), in accordance with various embodiments.

FIG. 21 shows an example data transfer methodology through a NIC, in accordance with various embodiments. FIG. 21 depicts a data transfer scheme that transfers data from a memory device 2134a of a memory appliance 2102 over the network 2120 without the need to transfer the data to the host CPU 2104 of the memory appliance 2102. The data transfer scheme of FIG. 21 thus bypasses the host CPU 2104.

The host CPU 2104 is configured to manage data transfers between memory devices (e.g., MD 2132a-MD 2132j). For example, the host CPU 2104 can issue commands (e.g., for a data transfer between memory devices) and resolve issues between memory devices without having to read and write each byte of data between memory devices. The servers 2122a-2122i send requests to read, write, and copy data to the host CPU 2104. The host CPU 2104 handles the mechanics of data access control and data copying for the servers and further handles resolving issues with the accesses to data and data copying.

A request for data is received from server 2122a at a host CPU 2104 via a NIC 2112. The host CPU 2104 sets up the transfer for the data from the memory device 2134a to the NIC 2112. The data transfer is then offloaded to the NIC 2112 which executes the data transfer. In some embodiments, the host CPU 2104 creates an entry in a queue for an engine 2114 of the NIC 2112. The entry in the queue is a request to copy the data 2150a from the memory device 2132a over the network 2120 to a particular client that requested the data. The engine 2114 of the NIC 2112 fetches the request from the queue and executes the request. The engine 2114 of the NIC 2112 is configured to transfer data from a source location to a destination location for the NIC 2112. In some embodiments, the host CPU 2104 sets up a packet header with the source and destination location. For example, the source and destination locations can be pointers. In some embodiments, the addresses are virtual global addresses. The engine 2114 of the NIC 2112 may be a direct memory access (DMA) engine. The engine 2114 of the NIC 2112 thus fetches the data directly from the memory device 2132a instead of fetching the data from the host memory 2110.

In some embodiments, the host CPU 2104 configures the local interconnect 2106 to perform address translation thereby enabling the engine 2114 of the NIC 2112 to perform data transfers thereby bypassing the host CPU 2104. The NIC 2112 receives a request from the host CPU 2104 and sends a request for the data 2150a to the local interconnect 2106. The local interconnect 2106 translates the address and sends the request with the translated address to the memory device 2132a. The memory controller 2136a of the memory device 2132a then accesses the data 2150a from the memory 2134a and sends the data 2150a to the engine 2114 of the NIC 2112 via the local interconnect 2106 transparently to the CPU 2104. The NIC 2112 sends the data out over the network interconnect 2120 (e.g., Ethernet) to the client server 2122a. The data in the memory devices 2132a-j is thus available to the NIC 2112 via the local interconnect 2106 and thereby available to the external client servers 2122a-i.

The NIC 2120 thus copies the data 2150a directly from the memory device 2132a, via the memory controller 2136a and sends the data 2150a over the network 2120 to the requesting server 2122a instead of the NIC 2112 accessing the data from host memory 2110 of the host CPU 2104. This data transfer scheme is performed transparently to the CPU 2104 and advantageously eliminates the overhead of the unnecessary data movement to/and from the host CPU 2104 on its way to NIC 2112. This methodology reduces overall latency as well as reducing overall local interconnect and CPU memory traffic.

In some embodiments, a server 2122x is coupled to the local interconnect 2106 (e.g., PCIe) and may issue requests though the local interconnect 2106 for accessing or copying data in one or more memory devices of the memory appliance 2102. For example, a request from server 2122x may be received by the host CPU 2104 and offloaded, as described herein, to improve efficiency.

In some embodiments, the local interconnect 2106 includes an engine 2108 configured to offload requests from the host CPU 2104 or offload requests received via the local interconnect 2106. For example, the engine 2108 of the local interconnect 2106 may function in a substantially similar manner as the engine 2114 of the NIC 2112. The engine 2108 of the local interconnect 2106 may function as a DMA engine.

Figure 22:
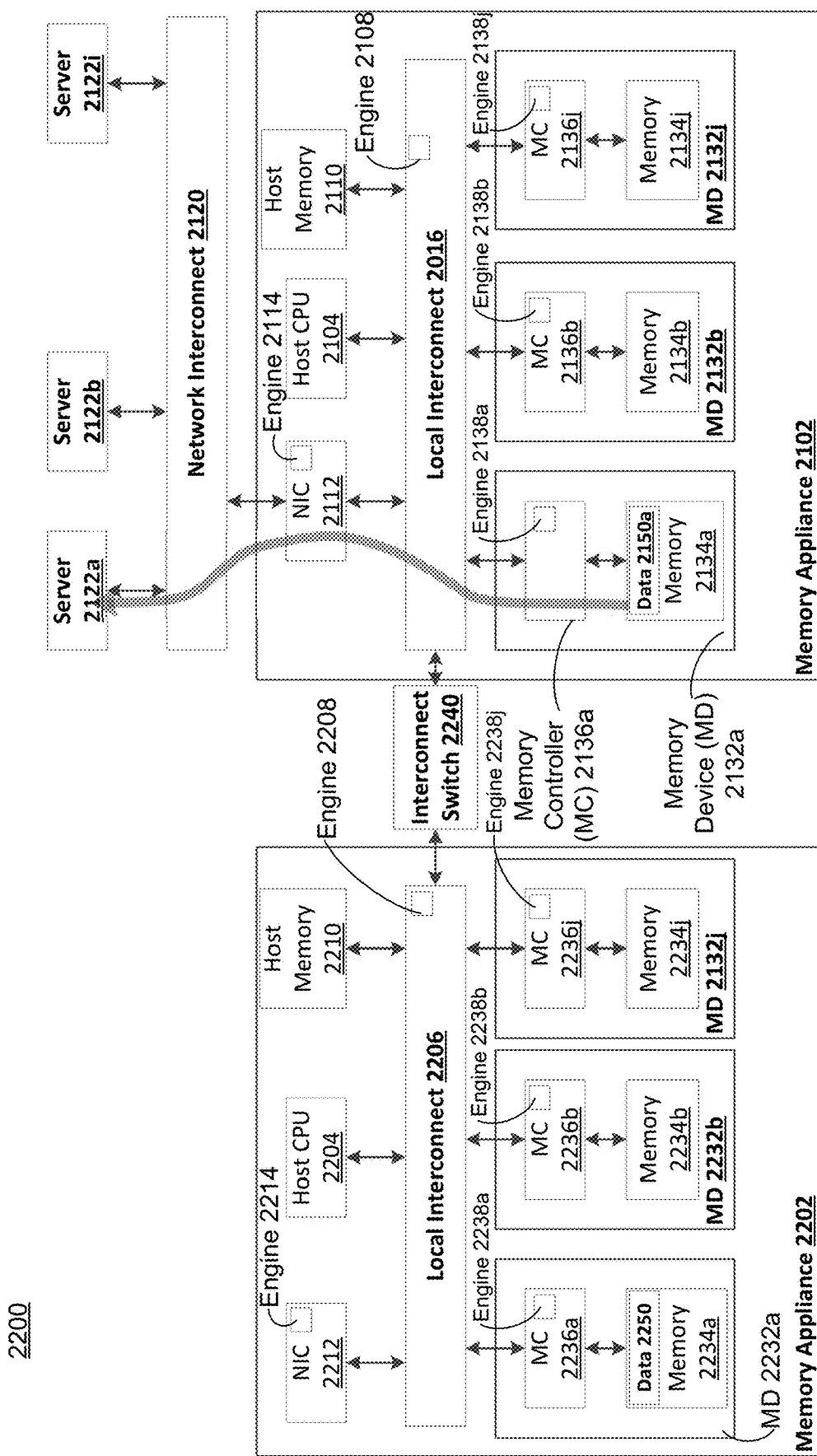
FIG. 22 shows a configuration with a plurality of memory appliances, in accordance with various embodiments.

FIG. 22 shows a configuration with a plurality of memory appliances, in accordance with various embodiments. FIG. 22 depicts a first memory appliance 2102 and a second memory appliance 2202 coupled via an interconnect switch 2240. In some embodiments, the interconnect switch 2240 is a PCIe switch. A request to access or copy data located in the second memory appliance 2202 may be responded to via the interconnect switch 2240 and may be performed and offloaded in a substantially similar manner as described herein. In some embodiments, additional servers may connect to additional memory appliances via a switch fabric (e.g., PCIe switch fabric, interconnect switch, etc.).

In conventional network environments, many clients share the resources of a storage device and need to exchange data. Two clients can exchange data while the storage device is unaware of the fact that the two clients share the same storage device. Transfers of data from the first client to the second client involve the data being sent to the second client over the network and through the CPU of the storage device. The data is then sent from the second server through the network again to the CPU of the storage device and then stored in a storage area for the second server within the storage device. However, this is an expensive option in terms of latency and throughput. Furthermore, the increase in overall network utilization slows down network traffic for all other clients.

Figure 23:
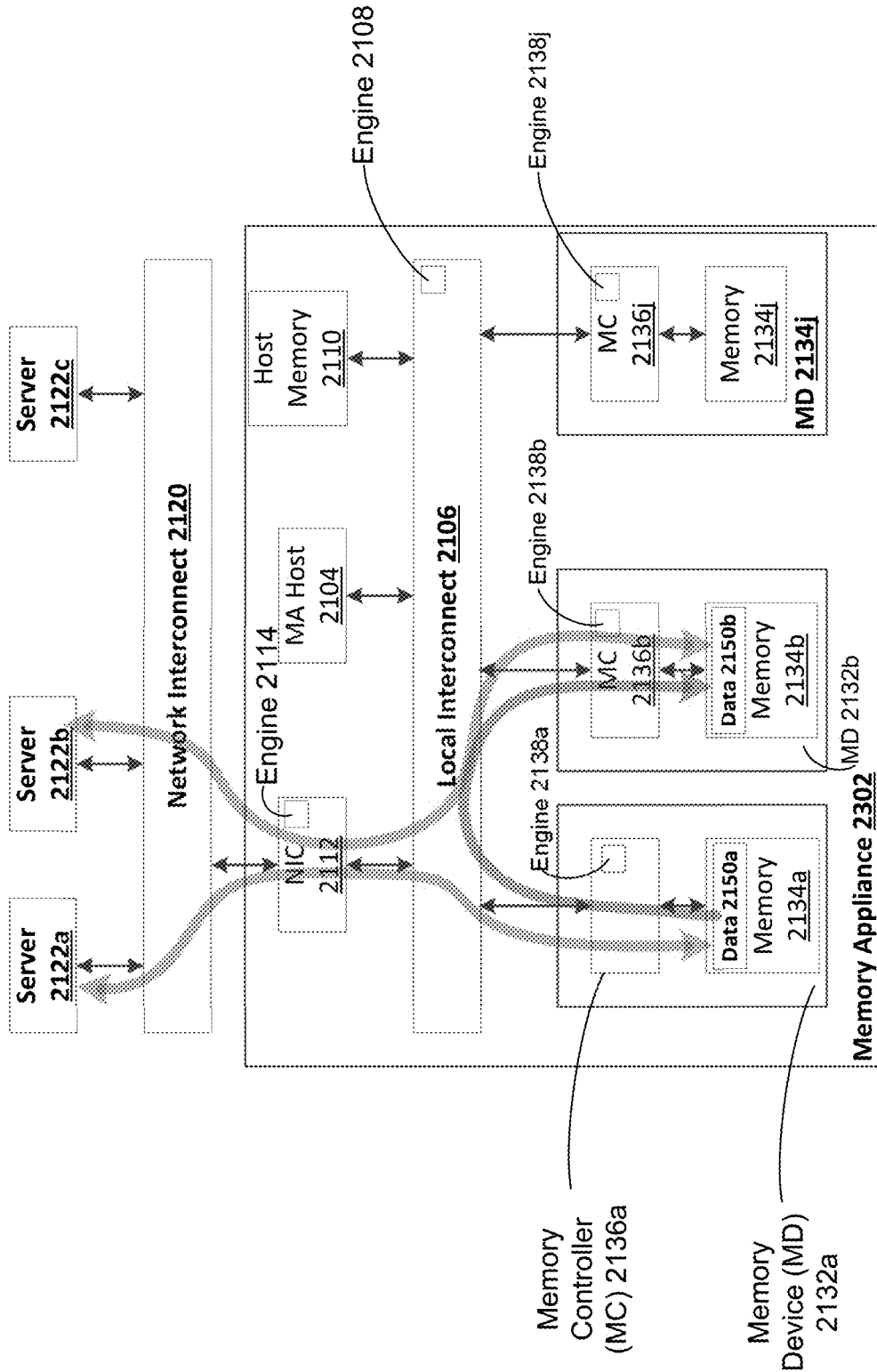
FIG. 23 shows a data transfer methodology between memory devices, in accordance with various embodiments.

FIG. 23 shows a data transfer methodology between memory devices, in accordance with various embodiments. FIG. 23 depicts a direct transfer between two memory devices 2132*a-b* within a memory appliance 2302 based on a request to copy data from one memory device 2132*a* to another memory device 2132*b*. The direct data transfer between the memory devices 2132*a-b* is performed instead of transferring the data between the first memory device 2132*a* to the server 2122*a* requesting the copy operation and then from the server 2122*a* requesting the copy operation to the second memory device 2132*b*. FIG. 23 thus depicts a data transfer scheme that by-passes the transfer of data out of the memory appliance 2302, across a network 2120, and then back into the memory appliance 2302. In some embodiments, the memory appliance host CPU 2104 manages transfers unless a memory controller 2136*a* (e.g., with an embedded DMA engine) is configured to transfer data.

The server 2122*b* requests data that was generated by the server 2122*a*. For example, the server 2122*a* produces data 2150*a* stored in memory device 2132*a* and the client server 2122*b* needs to access the data 2150*a* for a computation. The client server 2122*b* requests to access the data 2150*a* produced by the client server 2122*a* and then has the data 2150*a* stored in the local data area 2150*b* (e.g., partition) for the client server 2122*b* in order for it to be able to process the data. The client server 2122*b* is requesting a copy of the data 2150*a* in order to perform a computation without impacting the original data determined by the client server 2122*a*.

In some embodiments, the host CPU or memory appliance host 2104 is configured to manage transfers and network traffic, interpret high-level client requests (e.g., GET, SET, COPY, etc.), perform mapping from a client name space to a memory device physical address space, create command chains to be executed by the memory devices to implement requests, confirm successful completion, and handle any error before acknowledging to the client. For example, with a COPY request, the command chain generated by the host CPU 2104 directs the local memory device engine 2138*a* (e.g., DMA engine) to perform a transfer to a peer memory device to or from appropriately mapped physical addresses and notify the host CPU 2104 of completion status. In some embodiments, the host CPU 2104 passes the physical addresses to the memory device engine 2138*a* via command chain parameters (e.g., pointer to scatter-gather lists in host CPU memory).

The host CPU 2104 is configured to manage transfers between memory devices 2132*a-j* and configured to resolve issues between memory devices 2132*a-j*. In some embodiments, the memory devices 2132*a-j* are configured to be peers without the ability to master communications to other memory devices. The host CPU 2104 can be configured to master communications between the memory devices 2132*a-j*. The host CPU 2104 may make global decisions across the memory devices 2132*a-j* which advantageously allow the host CPU 2104 to handle situations where something goes wrong or needs to be pre-empted. For example, if memory device 2132*a* has a hardware failure (e.g., dynamic random-access memory (DRAM) hard error) and needs to start a recovery process, the host CPU 2104 can handle the issue without escalating the error back to the requesting server which is not aware of the details of the memory appliance or the memory device. The host CPU 2104 can thus master transactions and resolve issues.

In some embodiments, the memory devices 2132*a-j* have different characteristics. For example, the memory device 2132*a* can have dual in-line memory modules (DIMMs) with different characteristics as compared to the DIMMs of memory device 2132*b* (e.g., different timing parameters, DIMMs that are twice the density of the DIMMs of memory device 2, etc.). The memory device 2132*a* may not need to inform memory device 2132*b* where to store data but should not send data faster than the memory device 2132*b* can receive data. The host CPU 2104's management of the transfer can address these issues. The host CPU 2104 can be configured to store information associated with the makeup of the memory devices 2132*a-j*. The host CPU 2104 can manage a copy operation from one memory device to another memory device in small chunks (e.g., least common denominator page size) and manage source and destination addresses. The host CPU 2104 may interact with the memory devices 2132*a-j* during a data transfer.

Referring to FIG. 23, the host CPU 2104 receives a request from the client server 2122*b* to copy data from the memory device 2122*a* to the memory device 2122*b*. The host CPU 2104 determines that memory device 2132*a* and memory device 2132*b* are coupled to the same local interconnect 2106. The host CPU 2104 has access to information about the memory devices 2132*a-b* and whether either of the memory devices 2132*a-b* is busy. The host CPU 2104 then sends a request to the memory controller 2138*a* of the memory device 2132*a* to send data 2150*a* to the memory controller 2138*b* of memory device 2132*b*. In some embodiments, the request sent to the memory device 2132*a* includes virtual global addresses. The memory device 2132*a* is able to transfer data from itself to another memory device using global addresses. The encoding in the address bits can be used by the memory device to determine where the source and destination devices are located.

For example, if the memory device 2132*a* has DIMMs with a 2 KB page size and the memory device 2132*b* has DIMMs with a 1 KB page size, the host CPU 2104 instructs the memory device 2132*a* to transfer data to the memory device 2132*b* in 1 KB chunks. The CPU host 2104 can receive status messages from the memory device 2132*a* and the memory device 2132*b* to ensure the transfer is working properly. The host CPU 2104 can resolve any issues or manage recovery processes in case of an error and can signal the requesting server upon completion, or if the transfer fails.

The memory controller 2138*a* then sends the data to memory controller 2138*b* which stores the data 2150*a* into the memory 2134*b* of memory device 2138*b*. This transfer occurs transparently with respect to the client server 2122*b*. In some embodiments, the transfer between the memory controller 2138*a* and memory controller 2138*b* is through a remote direct memory access (RDMA) transfer. The remote DMA transfer can be configured by the host CPU 2104.

In some embodiments, the memory controllers 2138*a-j* of the memory devices can also perform computations on the data. The memory controllers 2138*a-j* can have respective engines. For example, an engine of the memory controller 2138*a* performs a computation before sending the data to the memory controller 2138*b*. As another example, an engine of the memory controller 2138*b* performs a computation on the data prior to storing the data in the memory of memory device 2132*b*.

This data transfer methodology thus eliminates the unnecessary data movement across the network and replaces it with a local copy operation. The local copy operation can advantageously be performed via the low-latency high bandwidth local (PCIe) interconnect. The local copy operation can be performed by a DMA engine located in either the source or the destination memory device. This mechanism may be exposed to the software network stack as an optimized custom RDMA operation.

In some embodiments, the local interconnect 2106 includes an engine 2138*j* configured to offload requests from the host CPU 2104 or offload requests received via the local interconnect 2106. For example, the engine 2108 of the local interconnect 2106 may function in a substantially similar manner as the engine 2114 of the NIC 2112. The engine 2108 of the local interconnect 2106 may function as a DMA engine.

Figure 24:
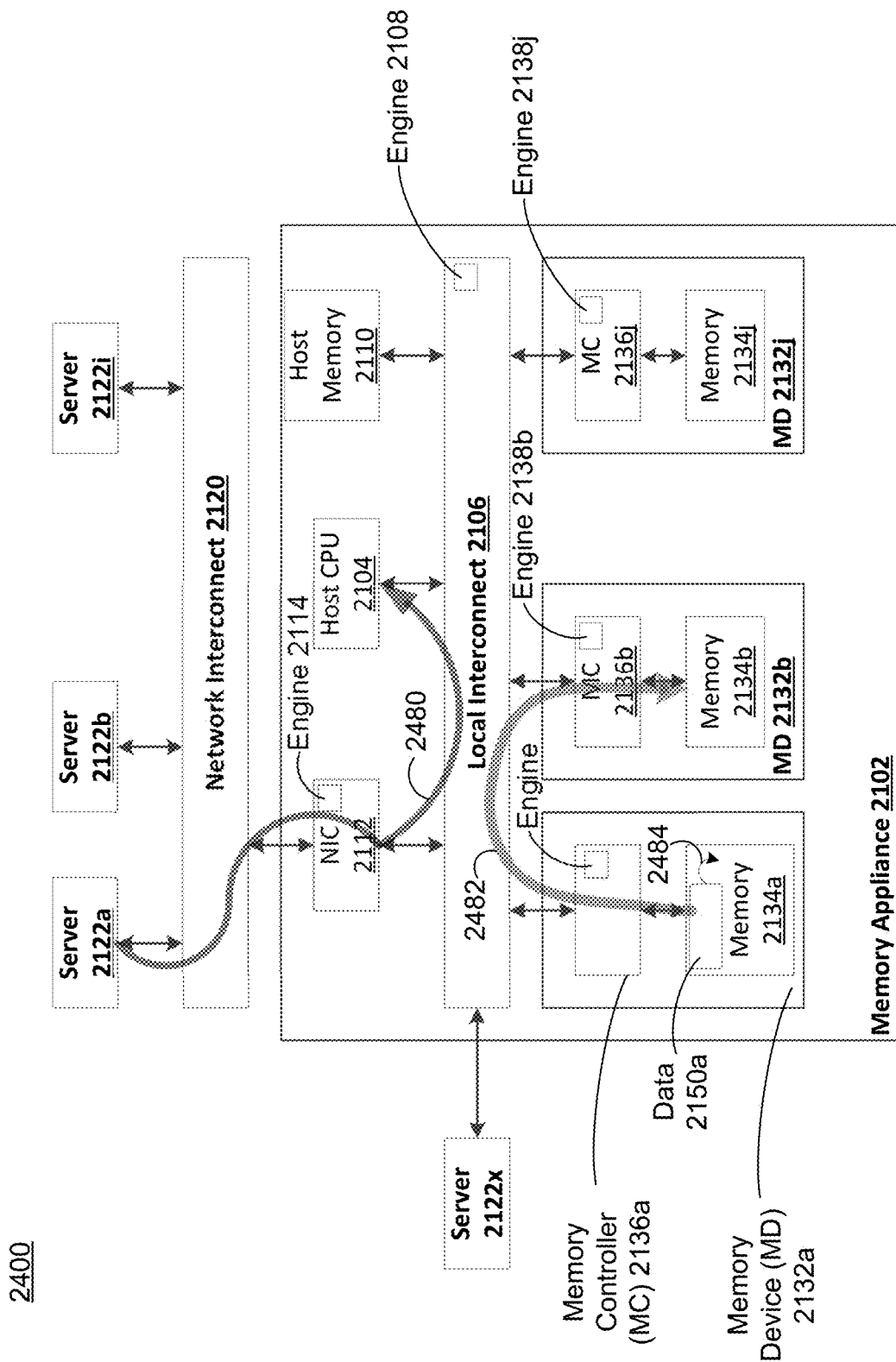
FIG. 24 show a request being processed by a memory appliance, in accordance with various embodiments.

FIG. 24 show a request being processed by a memory appliance, in accordance with various embodiments. FIG. 24 depicts a direct transfer between two memory devices 2132*a-b* within a memory appliance 2102 controlled by a memory appliance host or host CPU 2104 based on a request 2480 to copy data from one memory device 2132*a* to another memory device 2132*b*. The direct data transfer 2482 between the memory devices 2132*a-b* is performed instead of transferring the data between the first memory device 2132*a* to the server 2122*a* requesting the copy operation and then from the server 2122*a* requesting the copy operation to the second memory device 2132*a* from server 2122*a*. In some embodiments, the request 2480 may include a command or instruction that directs the MA host 2104 to perform the data transfer 2482, e.g., without further involvement of the server 2122*a*. FIG. 24 thus depicts a data transfer scheme that by-passes the transfer of data across out of the memory appliance 2102, across a network 2120, and then back into the memory appliance 2102. In some embodiments, the memory appliance host CPU 2104 manages transfers unless a memory controller is configured to transfer data (e.g., by an embedded processor).

The request 2480 is received from server 2122*a* by a host CPU or MA host, via the network interconnect 2120 and a NIC 2112, to transfer data from memory within MD 2132*a* to MD 2132*b*. In response to the request 2480, the MA host 2104 initiates a data transfer 2482 of data specified within the request 2480 within MD 2132*a* to a location specified in the request 2480 within MD 2132*b*.

Figures 25A, 25B:
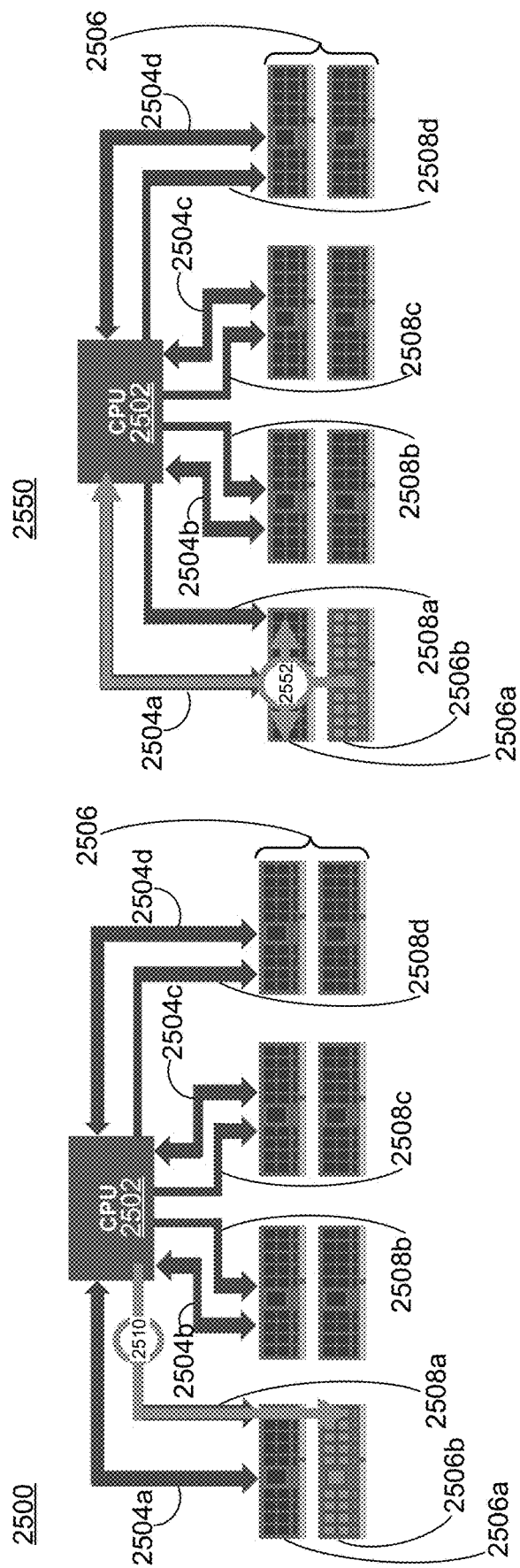
FIGS. 25A-B show example operations for reading and writing of data, in accordance with various embodiments.

In some embodiments, the data transfers of FIG. 24 can be performed in a manner substantially similar to the data transfer described with respect to FIGS. 25A-B as part of a data transfer within a memory device or between memory devices. For example, a data transfer 2484 can be performed to copy data within a memory device from a first address to a second address as described with respect to FIGS. 25A-B.

In some embodiments, the MA host 2104 may control access to MD 2132*b* and other MDs within the memory appliance 2102 and thereby may authorize or deny requests. For example, the MA host 2104 may maintain an access control list (e.g., within host memory) that specifies which of servers 2122*a-i* are allowed to access, change, and/or transfer data to and from particular MDs 2132*a-j*.

The MA host 2104 may further support Single Root I/O Virtualization (SR-IOV), other I/O virtualization configurations, and support sharing of memory among multiple virtual machines.

The MA host 2104 may support memory addressing and mapping of memory within the MDs 2132*a-j*.

The MA host 2104 may further support multicast or broadcast transfers. For example, the MA host 2104 may copy data from MD 2132*a* to multiple MDs simultaneously thereby transferring data across the local interconnect 2106 once.

The MA host 2104 may further support receiving an acknowledgment of completion of a transfer message or other messages, e.g., a failure message, from a memory device.

The MA host 2104 may further support a reference to a command chain comprising a unique instruction set that allows the MA host to receive a command from a server and perform a transfer based on a command with limited or no further involvement or communication with the server.

The MA host 2104 may further support customization of a transfer based on variances, e.g., speeds and capacities, between memory devices. For example, the MD 2132*a* may have a memory board with DDR4 memory while the MD 2132*b* has a memory board with DDR3 memory, the MA host 2104 may handle mapping of addresses between the boards which do not match up due to architectural differences of the DDR3 and DDR4 standards.

The MA host 2104 may support an initialization and registration process whereby different pieces of hardware within the memory appliance report the capabilities and properties of each piece of hardware. In some embodiments, the MA host 2104 may query the components within the memory appliance for details as part of a discovery process.

The MA host 2104 may support fault monitoring and fault tolerance features. The MA host 2104 may be configured to monitor the health and/or functionality of a memory device and upon detection of a fault condition, may transfer data from one memory device to another memory device. In some embodiments, the MA host 2104 may have a memory device in a standby or inactive mode and upon fault detection, activate the memory device, and transfer data to the activated memory device from a failing memory device. In other embodiments, the MA host 2104 may store parity data associated with data in a memory device to other memory devices thereby enabling reconstruction of the data after a failure. In some embodiments, the MA host 2104 may shadow data to another memory device so that at least two copies of data are stored in separate memory devices. These memory devices may be in the same memory appliance, or in different memory appliances.

FIGS. 25A-B show example operations for reading and writing data, in accordance with various embodiments. FIGS. 25A-B depict a data transfer from a first memory module to a second memory module within a system. System 2500 includes central processing unit (CPU) 2502, data buses or memory channels 2504*a-d*, a plurality of memory modules 2506, and command/address buses 2508*a-d*. The CPU 2502 may be any type of processing component and is not limited to being a CPU. For example, the CPU 2502 may be a GPU, co-processor, system on a chip (SoC), etc. Each of memory channels 2504*a-d* may be logical structures having sets of data wires that are shared among each of the memory modules coupled thereto. The command/address busses 2508*a-d* are used to send commands (e.g., read or write commands) and associated addresses. Unique command/address (C/A) commands can be sent to each memory module to allow data to be stored at a different module address than it is read from.

The plurality of memory modules 2506 can include a variety of memory types including dynamic random-access memories (DRAMs), non-volatile memories (NVM), storage class memories (SCMs), etc. For example, one or more of the plurality of memory modules 2506 may have NAND memory components. In some embodiments, the plurality of memory modules 2506 include Non-Volatile DIMMs (NVDIMMs) or other DIMMs with a combination of volatile and non-volatile memory. In some embodiments, the NVM or SCM modules act as block storage (e.g., a disk). In some embodiments, the NVM storage is operated as block storage, with the system viewing the NVM storage as a solid state disk (SSD). In one embodiment, the memory module 2506b is a DIMM with NVM or SCM and the memory module 2506a is a DDR4 LRDIMM.

Data in block storage is generally moved to main memory before the data is manipulated by programs. For example, the data is moved to the main memory so that it can be accessed by the CPU. Data manipulation by programs can include CPU operations including floating point operations, logical operations, etc. Embodiments support reading data in the non-volatile RAM (NVRAM) and writing the data to the DRAM. Embodiments are further configured for direct transfer from memory to flash memory on the memory bus. For example, data in NVRAM can be moved to DRAM by putting the data on the memory bus once instead of putting the data on the memory bus twice. This improves performance and reduces power for systems with NVM and SCMs on the memory bus. Embodiments reduce the power used in moving data from NVM and SCM modules to other memory modules.

Referring to FIG. 25A, the CPU 2502 initiates a copy operation by sending a read request 2510 to the memory module 2506b on the command/address bus 2508a.

Referring to FIG. 25B, the data is sent on the memory bus or memory channel 2504a by memory module 2502b in response to the read request. The data travels on the memory bus in both directions (e.g., towards the CPU and away from the CPU). The CPU 2502 sends a write request to the memory module 2506a. The data is stored by the memory module 2506a in response to a write command. In some embodiments, the CPU 2502 is coupled to the memory modules 2506a-b with independent command busses thereby allowing commands to be sent to the memory modules 2506a-b individually and concurrently or substantially concurrently. The data is thus transferred from the memory module 2506b to the memory module 2506a using half as much bandwidth to perform the copy thereby improving channel utilization. The copying is also done with lower latency and power than if the data was copied to the CPU first and then written out to a memory module.

In some embodiments, a programming mechanism is available to create and identify "direct transfer" data structures. For example, programming language constructs substantially similar to pragma and/or library calls like malloc can be used. In some embodiments, direct transfer data structures can be dynamically allocated where the data structures are allocated to the same physical memory channel.

For example, the allocation of memory for a "direct transfer" data structure is performed by the code of Table 1.

TABLE 1

Exemplary memory allocation code

```
dc_status = dc_malloc (a_host1, a_host2, 1024);
if (!dc_status) {
    fprintf(stderr,"Cannot dc_malloc\n");
    stop(0);
}
```

The dc_malloc function is a customized type of malloc operation that can function substantially similar to malloc and k_malloc. In some embodiments, the dc_malloc invokes the runtime to find a range of contiguous addresses that are free (e.g., on the same channel) and allocates them to the requesting program. The dc_malloc function allocates memory for which a direct transfer will occur.

In some embodiments, the call to "dc_malloc(a, b, size)" allocates "size" bytes over which a direct transfer can occur. The function call "dc_malloc(a, b, size)" sets the pointer "a" to an address at the start of the allocated memory space in one DIMM on a memory channel. The function call "dc_malloc(a, b, size)" sets the pointer "b" to another address on the same memory channel. The pointers "a" and "b" can have the same address alignment to ensure that as the corresponding addresses are traversed, the addresses in "a" and "b" are such that bank/row/column crossings happen for "a" and "b" at the same time. In some embodiments, the direct copy structures are created so that the addresses of each respective structure have matching bank row and column crossings on the memory modules. This avoids situations where accessing data to copy would cross a column boundary and could necessitate two reads for one write operation. The addresses for "a" and "b" can be configured so that there is a 1:1 mapping of physical addresses between two different DIMMs on the memory channel. The direct transfer memory portions can thus be thought of as "bound" together.

In some embodiments, one block of memory is allocated in the memory space and another (e.g., same size block) is allocated in another memory space. The portions of memory can be in the same memory space, e.g., User Space or OS/Kernel space, or one portion can be in User Space and the other portion can be in OS/Kernel space. In some embodiments, the program can proceed with execution without direct memory transfers.

For example, a direct copy operation can be performed by the code of Table 2. The direct copy function performs the direct copy where 'bytes' is number of bytes to copy.

TABLE 2

Exemplary direct copy operation code

```
direct_copy_status = direct_copy(a, b, bytes);
if (!direct_copy_status) {
    fprintf(stderr,"Direct Copy FAILED\n");
    stop(0);
}
```

FIG. 26 is a block diagram of an exemplary computing system 2600 including various embodiments. Computing system 2600 broadly represents any single or multi-processor computing device or system capable of executing computer-readable instructions. Examples of computing system 2600 include, without limitation, workstations, laptops, client-side terminals, servers, distributed computing systems, handheld devices, or any other computing system or device. In one configuration, computing system 2600 may include at least one processor 2614 and a system memory 2616.

Processor 2614 generally represents any type or form of processing unit capable of processing data or interpreting and executing instructions. In certain embodiments, processor 2614 may receive instructions from a software application or module. These instructions may cause processor 2614 to perform the functions of one or more of the exemplary embodiments described and/or illustrated herein. For example, processor 2614 may perform and/or be a means for performing, either alone or in combination with other elements, one or more of the identifying, determining, using, implementing, translating, tracking, receiving, moving, and providing described herein. Processor 2614 may also perform and/or be a means for performing any other steps, methods, or processes described and/or illustrated herein.

System memory 2616 generally represents any type or form of volatile or non-volatile storage device or medium capable of storing data and/or other computer-readable instructions. Examples of system memory 2616 include, without limitation, RAM, ROM, FLASH memory, or any other suitable memory device. Although not required, in certain embodiments computing system 2600 may include both a volatile memory unit (such as, for example, system memory 2616) and a non-volatile storage device (such as, for example, primary storage device 2632).

Computing system 2600 may also include one or more components or elements in addition to processor 2614 and system memory 2616. For example, in the embodiment of FIG. 26, computing system 2600 includes a memory controller 2618, an I/O controller 2620, and a communication interface 2622, each of which may be interconnected via a communication infrastructure 2612.

Communication infrastructure 2612 generally represents any type or form of infrastructure capable of facilitating communication between one or more components of a computing device. Examples of communication infrastructure 2612 include, without limitation, a communication bus (such as an ISA, PCI, PCIe, or similar bus) and a network. In one embodiment, system memory 2616 communicates via a dedicated memory bus.

Memory controller 2618 generally represents any type or form of device capable of handling memory or data or controlling communications between one or more components of computing system 2600. For example, memory controller 2618 may control communications between processor 2614, system memory 2616, and I/O controller 2620 via communication infrastructure 2612. Memory controller 2618 may perform and/or be a means for performing, either alone or in combination with other elements, one or more of the operations or features described herein.

I/O controller 2620 generally represents any type or form of module capable of coordinating and/or controlling the input and output functions of a computing device. For example, I/O controller 2620 may control or facilitate transfer of data between one or more elements of computing system 2600, such as processor 2614, system memory 2616, communication interface 2622, display adapter 2626, input interface 2630, and storage interface 2634. I/O controller 2620 may be used, for example, to perform and/or be a means for performing, either alone or in combination with other elements, one or more of the operations described herein. I/O controller 2620 may also be used to perform and/or be a means for performing other operations and features set forth in the instant disclosure.

Communication interface 2622 broadly represents any type or form of communication device or adapter capable of facilitating communication between example computing system 2600 and one or more additional devices. For example, communication interface 2622 may facilitate communication between computing system 2600 and a private or public network including additional computing systems. Examples of communication interface 2622 include, without limitation, a wired network interface (such as a network interface card), a wireless network interface (such as a wireless network interface card), a modem, and any other suitable interface. In one embodiment, communication interface 2622 provides a direct connection to a remote server via a direct link to a network, such as the Internet. Communication interface 2622 may also indirectly provide such a connection through, for example, a local area network (such as an Ethernet network), a personal area network, a telephone or cable network, a cellular telephone connection, a satellite data connection, or any other suitable connection.

Communication interface 2622 may also represent a host adapter configured to facilitate communication between computing system 2600 and one or more additional network or storage devices via an external bus or communications channel. Examples of host adapters include, without limitation, SCSI host adapters, USB host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 2622 may also allow computing system 2600 to engage in distributed or remote computing. For example, communication interface 2622 may receive instructions from a remote device or send instructions to a remote device for execution. Communication interface 2622 may perform and/or be a means for performing, either alone or in combination with other elements, one or more of the operations disclosed herein. Communication interface 2622 may also be used to perform and/or be a means for performing other operations and features set forth in the instant disclosure.

As illustrated in FIG. 26, computing system 2600 may also include at least one display device 2624 coupled to communication infrastructure 2612 via a display adapter 2626. Display device 2624 generally represents any type or form of device capable of visually displaying information forwarded by display adapter 2626. Similarly, display adapter 2626 generally represents any type or form of device configured to forward graphics, text, and other data from communication infrastructure 2612 (or from a frame buffer, as known in the art) for display on display device 2624.

As illustrated in FIG. 26, computing system 2600 may also include at least one input device 2628 coupled to communication infrastructure 2612 via an input interface 2630. Input device 2628 generally represents any type or form of input device capable of providing input, either computer- or human-generated, to computing system 2600. Examples of input device 2628 include, without limitation, a keyboard, a pointing device, a speech recognition device, or any other input device. In one embodiment, input device 2628 may perform and/or be a means for performing, either alone or in combination with other elements, one or more of the operations disclosed herein. Input device 2628 may also be used to perform and/or be a means for performing other operations and features set forth in the instant disclosure.

As illustrated in FIG. 26, computing system 2600 may also include a primary storage device 2632 and a backup storage device 2633 coupled to communication infrastructure 2612 via a storage interface 2634. Storage devices 2632 and 2633 generally represent any type or form of storage device or medium capable of storing data and/or other computer-readable instructions. For example, storage devices 2632 and 2633 may be a magnetic disk drive (e.g., commonly referred to as a hard drive), a floppy disk drive, a magnetic tape drive, an optical disk drive, a FLASH drive, or the like. Storage interface 2634 generally represents any type or form of interface or device for transferring data between storage devices 2632 and 2633 and other components of computing system 2600.

In one example, databases 2640 may be stored in primary storage device 2632. Databases 2640 may represent portions of a single database or computing device or a plurality of databases or computing devices. For example, databases 2640 may represent (be stored on) a portion of computing system 2600 and/or portions of example network architecture 2700 in FIG. 27 (below). Alternatively, databases 2640 may represent (be stored on) one or more physically separate devices capable of being accessed by a computing device, such as computing system 2600 and/or portions of network architecture 2700.

Continuing with reference to FIG. 26, storage devices 2632 and 2633 may be configured to read from and/or write to a removable storage unit configured to store computer software, data, or other computer-readable information. Examples of suitable removable storage units include, without limitation, a floppy disk, a magnetic tape, an optical disk, a FLASH memory device, or the like. Storage devices 2632 and 2633 may also include other similar structures or devices for allowing computer software, data, or other computer-readable instructions to be loaded into computing system 2600. For example, storage devices 2632 and 2633 may be configured to read and write software, data, or other computer-readable information. Storage devices 2632 and 2633 may also be a part of computing system 2600 or may be separate devices accessed through other interface systems.

Storage devices 2632 and 2633 may be used to perform, and/or be a means for performing, either alone or in combination with other elements, one or more of the operations disclosed herein. Storage devices 2632 and 2633 may also be used to perform, and/or be a means for performing, other operations and features set forth in the instant disclosure.

Many other devices or subsystems may be connected to computing system 2600. Conversely, all of the components and devices illustrated in FIG. 26 need not be present to practice the embodiments described herein. The devices and subsystems referenced above may also be interconnected in different ways from that shown in FIG. 26. Computing system 2600 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 2600. All or a portion of the computer program stored on the computer-readable medium may then be stored in system memory 2616 and/or various portions of storage devices 2632 and 2633. When executed by processor 2614, a computer program loaded into computing system 2600 may cause processor 2614 to perform and/or be a means for performing the functions of the example embodiments described and/or illustrated herein. Additionally or alternatively, the example embodiments described and/or illustrated herein may be implemented in firmware and/or hardware. For example, computing system 2600 may be configured as an ASIC adapted to implement one or more of the embodiments disclosed herein. Computing system 2600 may further include additional processing components including, but not limited to, a co-processor, an accelerator (e.g., a graphics processing unit (GPU)), and a system on a chip (SoC).

Figure 27:
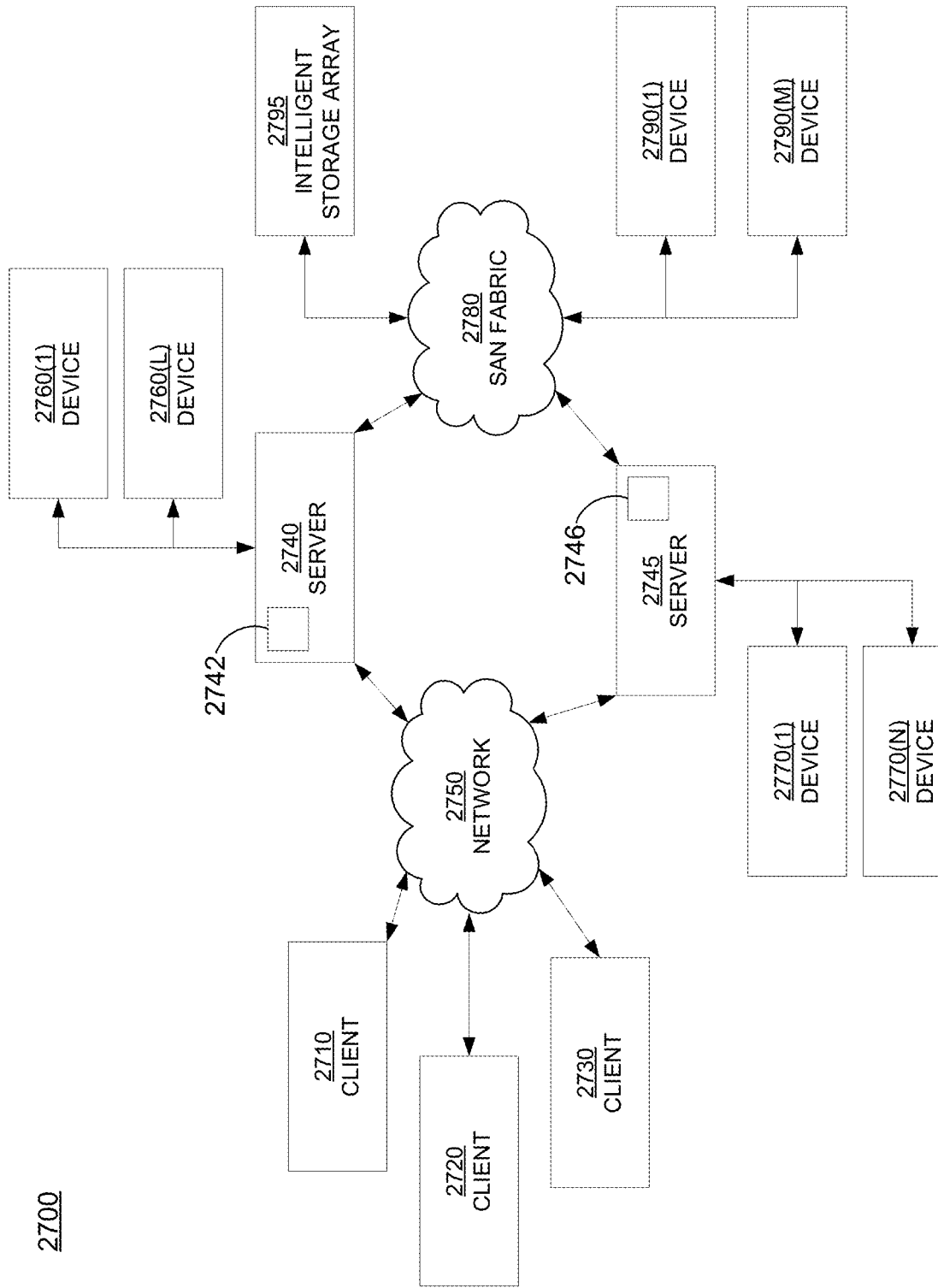
FIG. 27 is a block diagram of an exemplary operating environment, in accordance with various embodiments.

FIG. 27 is a block diagram of an example of an operating environment 2700 in which client systems 2710, 2720, and 2730 and servers 2740 and 2745 may be coupled to a network 2750. Client systems 2710, 2720, and 2730 generally represent any type or form of computing device or system, such as computing system 2600 of FIG. 26.

Similarly, servers 2740 and 2745 generally represent computing devices or systems, such as application servers or database servers, configured to provide various database services and/or run certain software applications. In some embodiments, the servers 2740 may include one or memory appliances 2742, as described herein. In some embodiments, the servers 2745 may include one or more memory appliances 2746, as described herein. Network 2750 generally represents any telecommunication or computer network including, for example, an intranet, a WAN, a LAN, a PAN, or the Internet.

As illustrated in FIG. 27, one or more storage devices 2760(1)-(L) may be directly attached to server 2740. Similarly, one or more storage devices 2770(1)-(N) may be directly attached to server 2745. Storage devices 2760(1)-(L) and storage devices 2770(1)-(N) generally represent any type or form of storage device or medium capable of storing data and/or other computer-readable instructions. Storage devices 2760(1)-(L) and storage devices 2770(1)-(N) may represent NAS devices configured to communicate with servers 2740 and 2745 using various protocols, such as NFS, SMB, or CIFS. They can also represent memory appliances configured to communicate with servers 2740 and 2745.

Servers 2740 and 2745 may also be connected to a SAN fabric 2780. SAN fabric 2780 generally represents any type or form of computer network or architecture capable of facilitating communication between storage devices. SAN fabric 2780 may facilitate communication between servers 2740 and 2745 and storage devices 2790(1)-(M) and/or an intelligent storage array 2795. SAN fabric 2780 may also facilitate, via network 2750 and servers 2740 and 2745, communication between client systems 2710, 2720, and 2730 and storage devices 2790(1)-(M) and/or intelligent storage array 2795 in such a manner that devices 2790(1)-(M) and array 2795 appear as locally attached devices to client systems 2710, 2720, and 2730. As with storage devices 2760(1)-(L) and storage devices 2770(1)-(N), storage devices 2790(1)-(M) and intelligent storage array 2795 generally represent any type or form of storage device or medium capable of storing data and/or other computer-readable instructions.

With reference to computing system 2600 of FIG. 26, a communication interface, such as communication interface 2622, may be used to provide connectivity between each client system 2710, 2720, and 2730 and network 2750. Client systems 2710, 2720, and 2730 may be able to access information on server 2740 or 2745 using, for example, a Web browser or other client software. Such software may allow client systems 2710, 2720, and 2730 to access data hosted by server 2740, server 2745, storage devices 2760(1)-(L), storage devices 2770(1)-(N), storage devices 2790(1)-(M), or intelligent storage array 2795. Although FIG. 27 depicts the use of a network (such as the Internet) for exchanging data, the embodiments described herein are not limited to the Internet or any particular network-based environment.

The above described embodiments may be used, in whole or in part, in systems that process large amounts of data and/or have tight latency constraints, and, in particular, with systems using one or more of the following protocols and formats: Key-Value (KV) Store, Memcached, Redis, Neo4J (Graph), Fast Block Storage, Swap Device, and Network RAMDisk. In addition, the above described embodiments may be used, in whole or in part, in systems employing virtualization, Virtual Desktop Infrastructure (VDI), distributed storage and distributed processing (e.g., Apache Hadoop), data analytics cluster computing (e.g., Apache Spark), Infrastructure as a Service (IaaS), Platform as a Service (PaaS), and other cloud computing platforms (e.g., VMware vCloud, Open Stack, Amazon Web Services (AWS), and Microsoft Azure). Further, the above described embodiments may be used, in whole or in part, in systems conducting various types of computing, including Scale Out, Disaggregation, Multi-Thread/Distributed Processing, RackScale, Data Center Scale Computing, Elastic Memory Provisioning, Memory as a Service, page migration and caching and Application Offloading/Acceleration and Integration, using various types of storage, such as Non-Volatile Memory Express, Flash, Multi-Tenancy, Internet Small Computer System Interface (iSCSI), Object Storage, Scale Out storage, and using various types of networking, such as 10/40/100 GbE, Software-Defined Networking, Silicon Photonics, Rack TOR Networks, PCIe, Infiniband, and Low-Latency networking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A memory appliance (MA) comprising:
a local interconnect;
a host central processing unit (CPU) coupled to the local interconnect; and
a plurality of memory modules coupled to the local interconnect and each comprising a memory controller and a memory component, wherein the MA is configured to store data within the plurality of memory modules;
wherein the local interconnect is configured to:
receive a request to access the data from at least one of a first server coupled to the local interconnect of the MA through a first connection, or a second server coupled to the local interconnect of the MA through a second connection, wherein the request to access the data stored in the MA comprises an address and is received by the local interconnect through the first or second connections to bypass at least one of a network switch or an interconnect switch disposed external to the MA;
perform an address translation to translate the address to a translated memory address associated with a corresponding one of the plurality of memory modules, while bypassing the host CPU of the MA, to access the data stored in the corresponding one of the plurality of memory modules responsive to the request;
send an access request to the corresponding one of the plurality of memory modules, the access request comprising the translated memory address;
receive the data from the one of the plurality of memory modules; and
send the data from the local interconnect to the at least one of the first server and the second server in response to the request to access the data.

2. The MA of claim 1, wherein the first and second connections are selected from the group consisting of PERIPHERAL COMPONENT INTERCONNECT EXPRESS (registered trademark), INFINIBAND (registered trademark), and Ethernet.

3. The MA of claim 1, wherein the network switch and the interconnect switch are selected from the group consisting of an Ethernet switch, a PERIPHERAL COMPONENT INTERCONNECT EXPRESS (registered trademark) switch, and an INFINIBAND (registered trademark) switch, and wherein the MA is disposed within a rack and the first and second server are disposed within the rack.

4. The MA of claim 1, wherein the local interconnect is configured to control access to portions of the plurality of memory modules within the MA by the first server and the second server.

5. The MA of claim 1, wherein the local interconnect is configured to partition portions of the plurality of memory modules within the MA.

6. A method of transferring data in a memory appliance (MA), the method comprising:
receiving, from a first server coupled to a local interconnect of the MA through a first connection and from a second server coupled to the local interconnect through a second connection, data requests to transfer data from a plurality of memory devices coupled to the local interconnect, each comprising a memory controller and a memory component, wherein the requests each comprise a respective memory address and are received by the local interconnect through the first and second connections to bypass at least one of a network switch or an interconnect switch disposed external to the MA;
configuring an engine of the local interconnect to transfer data from the plurality of memory devices to the first server and the second server through the first and second connections responsive to the data requests;
translating, by the engine of the local interconnect, the respective memory addresses associated with the data requests to translated addresses associated with corresponding ones of the plurality of memory modules, while bypassing a host central processing unit (CPU) of the memory appliance, and generate a translated memory address;
sending access requests to the plurality of memory devices, the access requests comprising the translated memory addresses;
receiving the data from the plurality of memory devices; and
sending the data from the local interconnect to the first server and the second server in response to the data requests.

7. The method of claim 6, wherein the plurality of memory devices is disposed within the memory appliance.

8. The method of claim 6, wherein the local interconnect is a PERIPHERAL COMPONENT INTERCONNECT EXPRESS (registered trademark) interconnect.

9. The method of claim 6, wherein the access requests are direct memory access (DMA) requests.

10. The method of claim 6, wherein the sending of the data is performed transparently to the CPU.

11. The method of claim 6, wherein the sending of the data by the local interconnect bypasses the CPU.

12. The method of claim 6, wherein the CPU receives the data requests and responsive thereto configures a request queue for the local interconnect to execute the data requests.

13. A computing device comprising:
a local interconnect comprising a processing engine;
a host central processing unit (CPU) coupled to the local interconnect; and
a plurality of memory devices coupled to the local interconnect and each comprising a memory controller and a memory component, wherein the computing device is configured to store data within the plurality of memory devices;
wherein the processing engine of the local interconnect is configured to:
receive requests to access the data from at least one of a first server coupled to the local interconnect of the computing device through a first connection, or a second server coupled to the local interconnect of the computing device through a second connection, wherein the requests to access the data stored in the MA comprise respective addresses and are received by the local interconnect through the first or second connections to bypass at least one of a network switch or an interconnect switch disposed external to the computing device;
perform an address translation to translate the respective addresses to translated memory addresses associated with corresponding ones of the plurality of memory modules, while bypassing the host CPU of the MA, to access the data stored in the corresponding ones of the plurality of memory devices responsive to the requests;
send access requests to the corresponding ones of the plurality of memory modules, the access requests comprising the translated memory addresses;
receive the data from the corresponding ones of the plurality of memory modules; and
send the data from the local interconnect to the at least one of the first server and the second server in response to the requests to access the data.

14. The computing device of claim 13, wherein the first and second connections are selected from the group consisting of PERIPHERAL COMPONENT INTERCONNECT EXPRESS (registered trademark), INFINIBAND (registered trademark), and Ethernet.

15. The computing device of claim 13, wherein the network switch and the interconnect switch are selected from the group consisting of an Ethernet switch, PERIPHERAL COMPONENT INTERCONNECT EXPRESS (registered trademark) switch, and an INFINIBAND (registered trademark) switch, and wherein the computing device is disposed within a rack and the first and second server are disposed within the rack.

16. The computing device of claim 13, wherein the processing engine of the local interconnect is configured to control access to portions of the plurality of memory devices within the computing device by the first server and the second server.

17. The computing device of claim 13, wherein the processing engine of the local interconnect is configured to partition portions of the plurality of memory devices within the computing device.

* * * * *